(12) United States Patent
Ionescu et al.

(10) Patent No.: US 12,057,568 B2
(45) Date of Patent: Aug. 6, 2024

(54) ELECTRODE SLURRY AND METHOD OF MANUFACTURE

(71) Applicant: ionobell, Inc., San Jose, CA (US)

(72) Inventors: Robert C. Ionescu, San Jose, CA (US); Chueh Liu, San Jose, CA (US)

(73) Assignee: ionobell, Inc., San Jose, CA (US)

( * ) Notice: Subject to any disclaimer, the term of this patent is extended or adjusted under 35 U.S.C. 154(b) by 0 days.

(21) Appl. No.: 18/219,295

(22) Filed: Jul. 7, 2023

(65) Prior Publication Data

US 2024/0014380 A1   Jan. 11, 2024

Related U.S. Application Data

(60) Provisional application No. 63/359,600, filed on Jul. 8, 2022.

(51) Int. Cl.
| | |
|---|---|
| *H01B 1/24* | (2006.01) |
| *H01M 4/36* | (2006.01) |
| *H01M 4/38* | (2006.01) |
| *H01M 4/587* | (2010.01) |
| *H01M 4/62* | (2006.01) |
| *H01M 4/02* | (2006.01) |

(52) U.S. Cl.
CPC .............. *H01M 4/364* (2013.01); *H01B 1/24* (2013.01); *H01M 4/386* (2013.01); *H01M 4/587* (2013.01); *H01M 4/622* (2013.01); *H01M 2004/021* (2013.01); *H01M 2004/027* (2013.01)

(58) Field of Classification Search
CPC .. H01B 1/00; H01B 1/20; H01B 1/24; H01M 4/04; H01M 4/364; H01M 4/386
See application file for complete search history.

(56) References Cited

U.S. PATENT DOCUMENTS

| | | | |
|---|---|---|---|
| 2,854,364 | A | 9/1958 | Anthony |
| 5,604,057 | A | 2/1997 | Nazri |
| 5,942,023 | A | 8/1999 | Bitler et al. |
| 6,060,680 | A | 5/2000 | Turner et al. |
| 7,087,346 | B2 | 8/2006 | Barker et al. |
| 7,097,939 | B2 | 8/2006 | Ferreira et al. |
| 8,012,676 | B2 | 9/2011 | Yoshiki et al. |
| 9,666,855 | B2 | 5/2017 | Voillequin et al. |
| 9,748,573 | B2 | 8/2017 | Yang et al. |

(Continued)

FOREIGN PATENT DOCUMENTS

| | | |
|---|---|---|
| CN | 102976342 A | 3/2013 |
| CN | 104300125 A | 1/2015 |

(Continued)

OTHER PUBLICATIONS

Kraytsberg et al "Conveying Advanced Li-ion Battery Materials into Practice The Impact of Electrode Slurry Preparation Skills", Adv. Energy Mater. Jun. 2016, 1600655.*

(Continued)

*Primary Examiner* — Mark Kopec

(74) *Attorney, Agent, or Firm* — Jeffrey Schox; Randy Mehlenbacher

(57) ABSTRACT

A silicon mixture can include active material, one or more additive, and optionally solvent. A method for making a silicon mixture can include reducing a silica precursor, fusing silicon particles, mixing constituents of a silicon mixture, and casting a film using the silicon mixture.

10 Claims, 7 Drawing Sheets

(56) References Cited

U.S. PATENT DOCUMENTS

| | | |
|---|---|---|
| 9,765,271 B2 | 9/2017 | Myrick |
| 10,147,950 B2 | 12/2018 | Sakshaug et al. |
| 10,263,249 B2 | 4/2019 | Kim et al. |
| 10,601,037 B2 | 3/2020 | Xia et al. |
| 10,608,254 B2 | 3/2020 | Sakshaug et al. |
| 10,658,659 B1 | 5/2020 | Mason et al. |
| 10,756,330 B2 | 8/2020 | Wang et al. |
| 10,763,501 B2 | 9/2020 | Feaver et al. |
| 10,777,807 B2 | 9/2020 | Haufe |
| 10,784,512 B2 | 9/2020 | Sakshaug et al. |
| 10,923,722 B2 | 2/2021 | Sakshaug et al. |
| 10,978,733 B2 | 4/2021 | Wegener et al. |
| 11,066,305 B1 | 7/2021 | Ionescu et al. |
| 11,133,493 B2 | 9/2021 | Sonntag et al. |
| 11,242,258 B1 | 2/2022 | Ionescu et al. |
| 11,437,621 B2 | 9/2022 | Sakshaug et al. |
| 11,532,818 B2 * | 12/2022 | Zhang .................. C09D 7/62 |
| 11,584,653 B2 | 2/2023 | Ionescu et al. |
| 11,591,478 B2 | 2/2023 | Ionescu et al. |
| 11,799,075 B2 | 10/2023 | Ionescu et al. |
| 2002/0025287 A1 | 2/2002 | Dastol et al. |
| 2005/0136330 A1 | 6/2005 | Mao et al. |
| 2008/0299455 A1 | 12/2008 | Shiozaki et al. |
| 2010/0078599 A1 | 4/2010 | Kumta et al. |
| 2010/0133111 A1 | 6/2010 | Nocera et al. |
| 2011/0052475 A1 | 3/2011 | Barati et al. |
| 2012/0244436 A1 | 9/2012 | Kerlau |
| 2012/0315538 A1 | 12/2012 | Chiang et al. |
| 2013/0115512 A1 | 5/2013 | Jiang et al. |
| 2013/0189575 A1 | 7/2013 | Anguchamy et al. |
| 2013/0189579 A1 | 7/2013 | Darby et al. |
| 2013/0212789 A1 | 8/2013 | Conolly et al. |
| 2013/0219704 A1 | 8/2013 | Haugseter et al. |
| 2014/0065492 A1 * | 3/2014 | Komaba ............... H01M 4/622 |
| | | 429/324 |
| 2014/0272573 A1 | 9/2014 | Xiao et al. |
| 2014/0322601 A1 | 10/2014 | Lee et al. |
| 2015/0099187 A1 | 4/2015 | Cui et al. |
| 2015/0155538 A1 | 6/2015 | Tang et al. |
| 2015/0321147 A1 | 11/2015 | Fleming et al. |
| 2016/0308205 A1 | 10/2016 | Canham et al. |
| 2016/0365568 A1 | 12/2016 | Haugseter et al. |
| 2017/0194631 A1 | 7/2017 | Favors et al. |
| 2017/0288231 A1 * | 10/2017 | Yoon .................. H01M 4/622 |
| 2018/0013137 A1 | 1/2018 | Put et al. |
| 2018/0083272 A1 | 3/2018 | Son et al. |
| 2018/0097229 A1 | 4/2018 | Jo et al. |
| 2018/0309095 A1 | 10/2018 | Olchawski et al. |
| 2018/0342757 A1 | 11/2018 | Choi et al. |
| 2019/0030600 A1 | 1/2019 | Lau et al. |
| 2019/0097222 A1 | 3/2019 | Feaver et al. |
| 2019/0140258 A1 | 5/2019 | Burshtain et al. |
| 2019/0181440 A1 | 6/2019 | Park et al. |
| 2019/0252685 A1 | 8/2019 | Abusleme et al. |
| 2019/0267616 A1 | 8/2019 | Das Gupta et al. |
| 2019/0267617 A1 | 8/2019 | Evans et al. |
| 2019/0280298 A1 | 9/2019 | Sakshaug et al. |
| 2019/0326593 A1 | 10/2019 | Ozkan et al. |
| 2020/0020935 A1 | 1/2020 | Costantino et al. |
| 2020/0044241 A1 | 2/2020 | Gigler et al. |
| 2020/0099043 A1 | 3/2020 | Bogart et al. |
| 2020/0194749 A1 | 6/2020 | Ogata et al. |
| 2020/0313175 A1 | 10/2020 | Shin et al. |
| 2020/0313193 A1 | 10/2020 | Shin et al. |
| 2020/0335826 A1 | 10/2020 | Collins et al. |
| 2020/0358100 A1 | 11/2020 | Duong et al. |
| 2020/0373562 A1 | 11/2020 | Lau et al. |
| 2020/0373578 A1 | 11/2020 | Wang et al. |
| 2020/0388846 A1 | 12/2020 | Kim et al. |
| 2020/0395616 A1 * | 12/2020 | Takahashi ............ H01M 4/139 |
| 2021/0005927 A1 * | 1/2021 | Hoffert ............ H01M 10/0585 |
| 2021/0057736 A1 | 2/2021 | Feaver et al. |
| 2021/0075055 A1 | 3/2021 | Duong et al. |
| 2021/0114886 A1 | 4/2021 | Rohani et al. |
| 2021/0143439 A1 | 5/2021 | Kim et al. |
| 2021/0175498 A1 | 6/2021 | Feaver et al. |
| 2021/0234173 A1 | 7/2021 | Wang et al. |
| 2021/0257621 A1 | 8/2021 | Spreafico et al. |
| 2021/0320320 A1 | 10/2021 | Yushin et al. |
| 2021/0344003 A1 | 11/2021 | Yushin et al. |
| 2022/0153593 A1 | 5/2022 | Ionescu et al. |
| 2022/0255071 A1 | 8/2022 | Ionescu et al. |
| 2022/0263082 A1 | 8/2022 | Ionescu et al. |
| 2022/0393162 A1 | 12/2022 | Ionescu et al. |
| 2023/0110918 A1 | 4/2023 | Ionescu et al. |
| 2023/0183076 A1 | 6/2023 | Ionescu et al. |
| 2023/0234854 A1 | 7/2023 | Ionescu et al. |

FOREIGN PATENT DOCUMENTS

| | | |
|---|---|---|
| CN | 108232139 A | 6/2018 |
| CN | 110828774 A | 2/2020 |
| DE | 102016221782 A1 | 5/2018 |
| DE | 102019213584 A1 | 3/2021 |
| DE | 102019213585 A1 | 3/2021 |
| EP | 1064982 A1 | 1/2001 |
| TW | 201926779 A | 7/2019 |
| WO | 2007102745 A1 | 9/2007 |
| WO | 2008140596 A2 | 11/2008 |
| WO | 2015031445 A1 | 3/2015 |
| WO | 2019161288 A1 | 8/2019 |
| WO | 2022220685 A1 | 10/2022 |

OTHER PUBLICATIONS

Liu et al "Mesoscale Elucidation of the Influence of Mixing Sequence in Electrode Processing", dx.doi.org/10.1021/la5038469 | Langmuir 2014, 30, 15102-15113.*

Wei et al "Small Molecule Slurry Additives for Si Alloy Coatings with CMC/SBR Binder", Journal of The Electrochemical Society, 166 (14) A3217-A3221 (2019).*

Evonik, Aerosil—Fumed Silica—Technical Overview, 104 pages, downloaded Feb. 17, 2021.

Wikipedia definition for Porous Silicon, 8 pages, first downloaded Oct. 6, 2020.

"Applications of sodium carboxymethyl cellulose As a Binder In Batteries", Sidley Chem, dated Oct. 11, 2014, https://celluloseether.com/applications-sodium-carboxymethyl-cellulose-binder-batteries/.

"Battery production—Density and Viscosity Quality Control of Battery Slurry Mixing and Coating Lines", Rheonics, https://rheonics.com/solutions-item/battery-production-slurry-mixing-and-coating/, first downloaded Jun. 22, 2022.

"Stability study of battery coating slurries", DataPhysics Instruments USA Corp., https://www.dataphysics-instruments.com/Downloads/ApplicationNote_MS_53_EN.pdf?v=1.0, first downloaded Jun. 22, 2022.

Abboud, Jaafar , et al., "Developing of nano sized fibrous eutectic silicon in hypereutectic Al—Si alloy by laser remelting", Scientific Reports, (2020) 10:12090.

Andersen, Hanne Flaten, et al., "Silicon-Carbon composite anodes from industrial battery grade silicon", Scientific Reports (2019) 9:14814.

Bai, Yangzhi , et al., "A high-performance silicon/carbon composite as anode materials for lithium ion batteries", Nano Express 2(2021) 01021.

Ball, Philip , "Silicon seduced from silica: Synthetic silicon could be cheaper and more delicate", Nature, May 19, 2003, 2 pages.

Barbehenn, George H., et al., "Battery Conditioner Extends the Life of Li-Ion Batteries", Linear Technology Magazine, Dec. 2009, pp. 29-30.

Bux, Sabah , et al., "Nanostructured Bulk Silicon as an Effective Thermoelectric Material", Adv. Func. Mater. 2009, 19, 2445-2452.

Campbell, Brennan , et al., "Carbon-Coated, Diatomite-Derived Nanosilicon as a High Rate Capable Li-ion Battery Anode", Scientific Reports, 6: 33050, Oct. 7, 2016, 9 pages.

Choi, Insoo , et al., "Fading mechanisms of carbon-coated and disproportionated Is/SIOx negative electrode (SI/SiOx/C) in Li-ion

(56) References Cited

OTHER PUBLICATIONS secondary batteries: Dynamics and component analysis by TEM", Electrochimica Acta 85 (2012) 369-376.

Dai, Fang, et al., "Minimized Volume Expansion in Hierarchical Porous Silicon upon Lithiation", ACS Appl. Mater. Interfaces Nov. 2019, pp. 13257-13263.

Darghouth, A., et al., "High Purity Porous Silicon Powder Synthesis by Magnesiothermic Reuction of Tunisina Silica Sand", Silicon, Research Gate, Apr. 2020, 11 pages.

Fang, Chen, et al., "Organic Solvent Free Process to Fabricate High Performance Silicon/Graphite Composite Anode", J. Compos. Sci. May 2021, 188. https://doi.org/10.3390/jcs5070188.

Favors, Zachary, "Scalable Synthesis of Nano-Silicon from Beach San for Long Cycle Life Li-ion Batteries", Scientific Reports, 4: 5623, 7 pages, published Jul. 8, 2014.

Favors, Zachary, et al., "Towards Scalable Binderless Electrodes: Carbon Coated Silicon Nanofiber Paper via Mg Reduction of Electrospun SiO2 Nanofibers", Scientific Reports, 5: 8246, 7 pages, published Feb. 6, 2015.

Gauthier, Magali, et al., "A low-cost and high performance ball-milled S-based negative electrode for high energy Li-ion batteries", Energy Environ. Sci., Jun. 2013, 2145-2155.

Gauthier, Magali, et al., "From SI-wafers to cheap and efficient Is electrodes for Li-ion batteries", Journal of Power Sources 256 (2014) 32-36.

Haregerwoin, Atetegeb Meazah, et al., "Electrolyte additives for lithium ion battery electrodes: progress and perspectives", The Royal Society of Chemistry 2016, Energy Environ. Sci. Sep. 2016, 1955-1988.

Hossain, M.R., et al., "Probing the surfaces of core-shell and hollow nanoparticles by solvent relaxation NMR", MRC, vol. 56, Issue 4, Apr. 2018, pp. 251-256.

Hyung, Yoo E., et al., "Flame-retardant additives for lithium-ion batteries", Journal of Power Sources 119-121 (2003) 383-387.

Ionescu, Robert C., et al., "Electronic Slurry and Method of Manufacture", U.S. Appl. No. 18/219,295, filed Jul. 7, 2023.

Jang, Hee Dong, et al., "Aerosol-Assisted Extraction of Silicon Nanoparticles from Wafer Slicing Waste for Lithium Ion Batteries", Scientific Reports, 5 : 9431, Mar. 30, 2015.

Jia, Haiping, et al., "A novel approach to synthesize micrometer-sized porous silicon as a high performance anode for lithium-ion batteries", Nano Energy 50 (2018) pp. 589-597.

Kang, M., et al., "Intrinsically conductive polymer binders for electrochemical capacitor application", The Royal Society of Chemistry Apr. 2014, 27939-27945.

Kim, Sang Woo, et al., "Current Collectors for Flexible Lithium Ion Batteries: A Review of Materials", J. Electrochemical. Sci. Techno. 6(1), 1-6 (2015).

Konda, Kumari, et al., "Optimization of Anode Slurry Preparation and Its Performance Evolution in Lithium-Ion Batteries", 2020 Meet. Abstr. MA2020-01 522.

Li, Qiuyan, et al., "Failure Analysis and Design Principles of Silicon-Based Lithium-Ion Batteries Using Micron-Sized Porous Silicon/Carbon Composite", SSRN, posted Jun. 30, 2022, https://papers.ssrn.com/sol3/papers.cfm?abstract_id=4150565.

Li, Changling, et al., "Silicon Derived from Glass Bottles as Anode Materials for Lithium Ion Full Cell Batteries", Scientific Reports, 7:917, 11 pages, published Apr. 19, 2017.

Lu, Yang, et al., "Cold welding of ultra thin gold nanowires", Nature Nanotechnology, vol. 5, Mar. 2010.

Maroni, Fabio, et al., "Near-Zero Volume Expansion Nanoporous Silicon as Anode for Li-ion Batteries", Journal of The Electrochemical Society, 2022 169 080506, published Aug. 8, 2022.

McBrayer, Josefine D., et al., "Calendar aging of silicon-containing batteries", Nature Energy, vol. 6, Sep. 2021, 866-872, www.nature.com/natureenergy.

Nguyen, Van At, et al., "Review-Conducting Polymer-Based Binders for Lithium-Ion Batteries and Beyond", Journal of the Electrochemical Society, 2020 167 065501.

Nzabahimana, Joseph, "Porous carbon-coated ball-milled silicon as high-performance anodes for lithium-ion batteries", J Master Sci (2019) 54: 4798-481; http://doi.org/10.1007/s10853-018-3164-9 p. 4801 para 2, Scheme 1; p. 4802 para 2; Figure 1(d).

Reynolds, Carl D., et al., "Rheology and Structure of Lithium-Ion Battery Electrode Slurries", Energy Technol. Oct. 2022, 2200545.

Scheffler, Sören, et al., "Calendering of Silicon-Containing Electrodes and Their Influence on the Mechanical and Electrochemical Properties", Batteries Aug. 2022, 46. https://doi.org/10.3390/batteries8050046, published May 18, 2022.

Shen, Xiaohui, et al., "Research progress on silicon/carbon composite anode materials for lithium-ion battery", Journal of Energy Chemistry 27 (2018) 1067-1090.

Situmeang, Rudy Tahan Mangapul, "Preparation of Hollow Nanostructures via Various Methods andTheir Applications", From the Edited Volume, Novel Nanomaterials, Edited by Karthikeyan Krishnamoorthy, published: Jan. 4, 2021.

Suthabanditpong, W., et al., "Improved optical properties of silica/UV-cured polymer composite films made of hollow silica nanoparticles with a hierarchical structure for light diffuser film applications", Phys. Chem. Chem. Phhys., 2016, 18, 16293.

Tan, Darren H.S., et al., "Carbon-free high-loading silicon anodes enabled by sulfide solid electrolytes", Science 373, 1494-1499 (2021) Sep. 24, 2021.

Tong, Ling, et al., "Interface Engineering of Silicon/Carbon Thin-Film Anodes for High-Rate Lithium-Ion Batteries", ACS Apps. Mater. Interfaces Dec. 2020, 29242-29252.

Tseng, Yu-Hsien, et al., "On-site coagulation gel polymer electrolytes with a high dielectric constant for lithium-ion batteries", Journal of Power Sources 480 (2020) 228802.

Tveit, Halvard, et al., "Production of High Silicon Alloys", Research Gate Article, Jan. 1998.

Wang, Dingsheng, et al., "High performance amorphous-Si@SiOx/C composite anode materials for Li-ion batteries derived from ball-milling and in situ carbonization", Journal of Power Sources 256 (2014) 190-199.

Wang, Wei, et al., "Monodisperse Porou Silicon Spheres as Anode Materials for Lithium Ion Batteries", Scientific Reports, 5: 8781 6 pages, published Mar. 5, 2015.

Wang, Fei, et al., "One-pot solution synthesis of carbon-coated silicon nanoparticles as an anode material for lithiumim-ion batteries", Chem. Commun., 2020, 56, 1109-1112.

Yan, Zheng, "Silicon Li-ion Anode Materials via Spray Drying and Magnesiothermic Reduction", published on Jun. 2019, Chemical and Environmental Engineering, pp. 1-106).

Yazdi, Sadegh, et al., "Tuning the Resonance Frequency of Surface Plasmons Localized in Au—Ag Bimetallic Hollow Nanorods In-situ in a Transmission Electron Microscope", Technical Report, Microscopy and Microanalysis, Jul. 2019.

Zhang, Tianwen, "Porous silicon nano-aggregate from silica fume as an anode for high energy lithium-ion batteries", RSC Adv. Jun. 2016, 30577-30581.

Zheng, Honghe, et al., "Optimization of ratio and amount of CMC/SBR binder for a graphite anode", Abstract #200, 218th ECS Meeting, © 2010 The Electrochemical Society.

Ionescu, Robert C., et al., "System and Method for Silicon Material Manufacturing", U.S. Appl. No. 18/536,796, filed Dec. 12, 2023.

Garrity, Matthew, et al., "Solid State Battery with Silicon Anode", U.S. Appl. No. 18/732,190, filed Jun. 3, 2024.

* cited by examiner

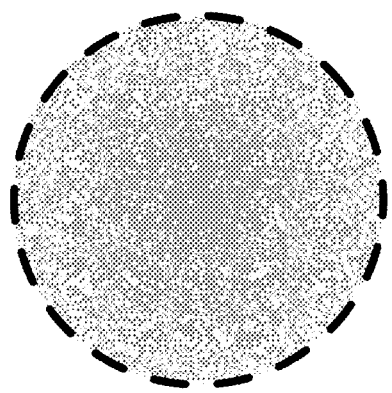
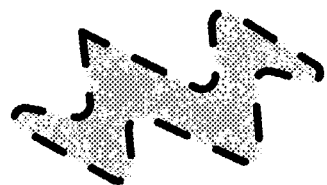
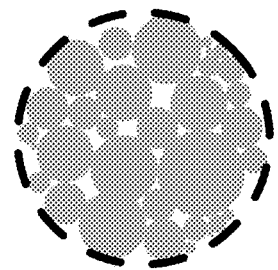
FIGURE 1A              FIGURE 1B              FIGURE 1C
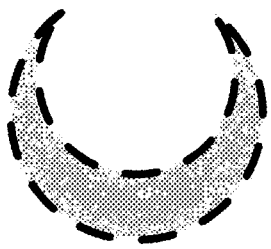
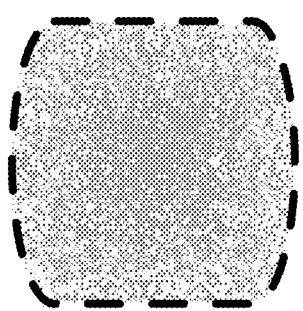
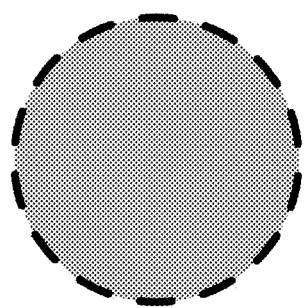
FIGURE 1D              FIGURE 1E              FIGURE 1F
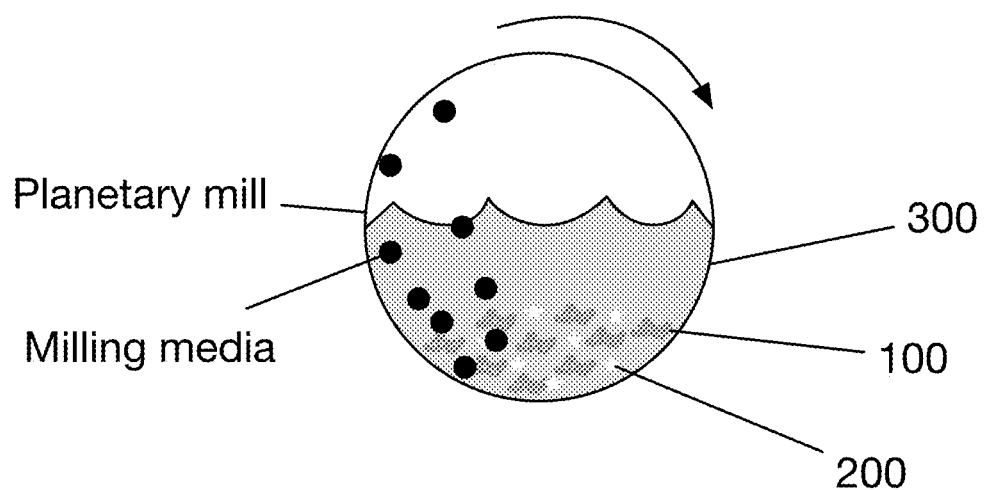
FIGURE 2

ELECTRODE SLURRY AND METHOD OF MANUFACTURE

CROSS-REFERENCE TO RELATED APPLICATIONS

This application claims the benefit of U.S. Provisional Application Ser. No. 63/359,600 filed 8 Jul. 2022, which is incorporated in its entirety by the reference.

TECHNICAL FIELD

This invention relates generally to the electrode field, and more specifically to a new and useful system and method in the electrode field.

BRIEF DESCRIPTION OF THE FIGURES

FIGS. 1A-1F are schematic representations of examples of silicon particles.

FIG. 2 is a schematic representation of an example of mixing a silicon slurry using a mill.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 3:
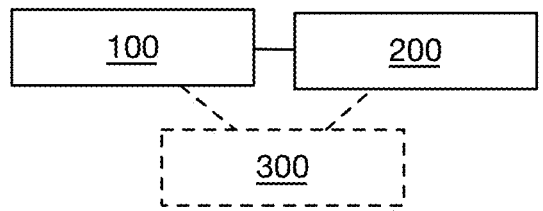
FIG. 3 is a schematic representation of an example of the silicon mixture.

As shown in FIG. 3, the silicon mixture can include active material (e.g., material that contributes to a capacity of a battery anode such as graphite, silicon, etc.), one or more additive, and optionally solvent. The silicon mixture is preferably a homogeneous mixture, but can additionally or alternatively be an inhomogeneous mixture.

Figure 6:
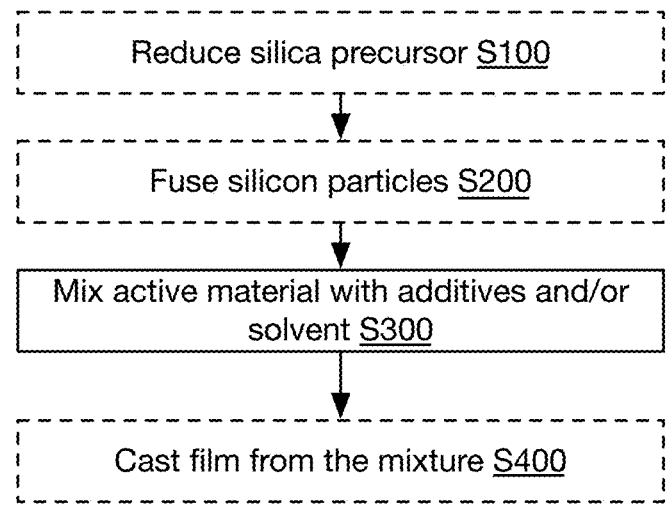
FIG. 6 is a flow chart representation of an example method for manufacturing a silicon mixture.

As shown for example in FIG. 6, a method for making a silicon mixture can include optionally reducing a silica precursor S100, optionally fusing silicon particles S200, mixing constituents of a silicon mixture S300, and optionally casting a film using the silicon mixture S400.

The silicon mixture is preferably used as (e.g., to make or manufacture, as a precursor for, etc.) an anode material (e.g., an anode slurry) in a battery (e.g., a Li-ion battery, a battery as disclosed in U.S. patent application Ser. No. 17/672,532 titled 'SILICON ANODE BATTERY' filed 15 Feb. 2022, which is incorporated in its entirety by this reference, etc.). However, the silicon material can additionally or alternatively be used for photovoltaic applications (e.g., as a light absorber, as a charge separator, as a free carrier extractor, etc.), as a thermal insulator (e.g., a thermal insulator that is operable under extreme conditions such as high temperatures, high pressures, ionizing environments, low temperatures, low pressures, etc.), for high sensitivity sensors (e.g., high gain, low noise, etc.), as a radar absorbing material, as insulation (e.g., in buildings, windows, thermal loss and solar systems, etc.), for biomedical applications, for pharmaceutical applications (e.g., drug delivery), as an aerogel or aerogel substitute (e.g., silicon aerogels), and/or for any suitable application.

2. Benefits.

Variations of the technology can confer several benefits and/or advantages.

First, variants of the technology can improve a homogeneity of the silicon mixture. For example, using a mill (e.g., a ball mill) to mix the silicon particles, additives, and/or solvent can lead to improved homogeneity (e.g., relative to other mixing methodologies). In some variations (e.g., when the silicon particles are manufactured using ball milling to cold weld silicon particles together such as disclosed in U.S. patent application Ser. No. 17/824,627 titled 'SILICON MATERIAL AND METHOD OF MANUFACTURE' filed 25 May 2022 which is incorporated in its entirety by this reference, when ball milling is used to coat the silicon material such as disclosed in U.S. patent application Ser. No. 17/824,640 titled 'SILICON MATERIAL AND METHOD OF MANUFACTURE' filed 25 May 2022 which is incorporated in its entirety by this reference, etc.), the use of a ball mall for manufacturing the silicon material can be additionally or alternatively beneficial for enabling manufacture of the silicon mixture within a single apparatus (e.g., by introducing additive(s), solvent, etc. after manufacture of the silicon particles).

Figure 8:
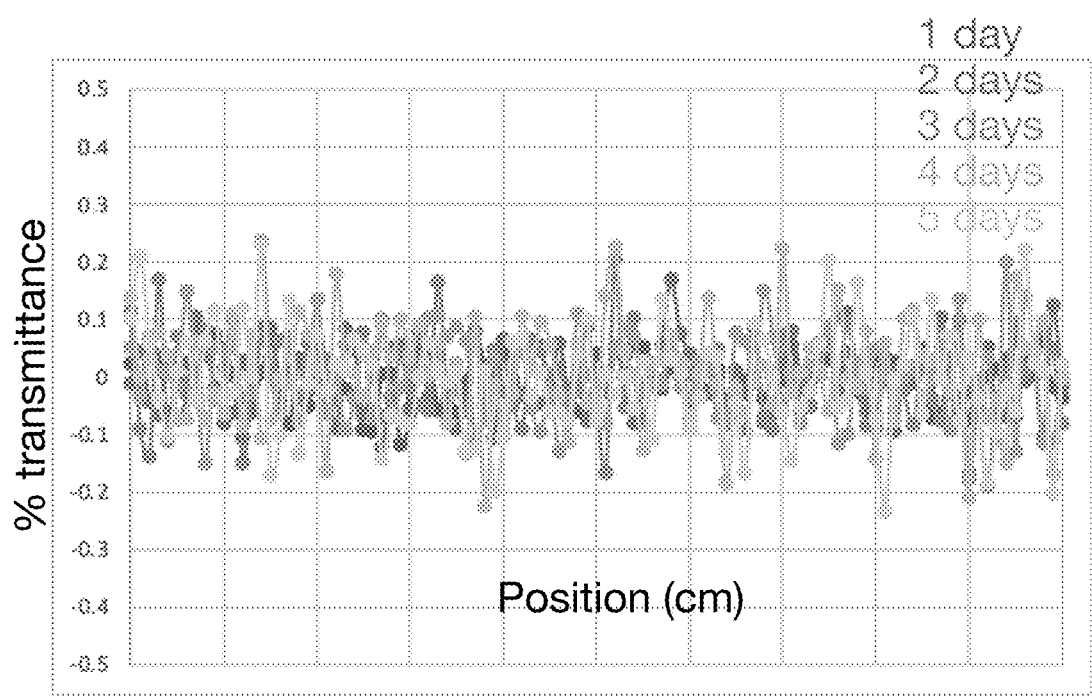
FIG. 8 is a schematic representation of data associated with stability of an exemplary slurry showing that overtime, the optical transmittance through different positions of a slurry (such as that shown in FIG. 7) does not substantially change over time (e.g., 100% transmittance would indicate that the materials have settled from solution while 0% transmittance suggests that the materials remain suspended in solution).

Second, variants of the technology can ensure a homogeneous distribution of silicon material and additives (in the mixture, in the resultant films). In a specific example, stepwise mixing of components (e.g., wetting the silicon, adding a first component, mixing the first component with the silicon before adding subsequent components and mixing) can help minimize silicon agglomeration and ensure that the silicon mixture is homogeneous (and that as the mixture dries, the resulting film is also homogeneous as shown for example in FIG. 10A, FIG. 10B, FIG. 11, FIG. 12, etc. such as with an areal constituent composition that is approximately the same as the overall composition within an area that is about 1 μm², 10 μm², 100 μm², 1 mm², 10 mm², etc.). In some variations, the homogeneity of the resulting film can be used to determine (e.g., deduce) the homogeneity of the silicon mixture. However, the homogeneity of the mixture can additionally or alternatively be determined based on scanning measurements (e.g., similar to the scanning measurement shown in FIG. 8), and/or can be determined in any manner.

Figure 7:
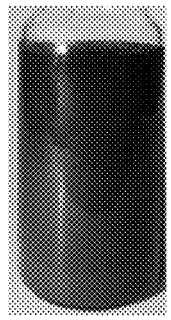
FIG. 7 is a photograph of an exemplary slurry.

Third, variants of the technology can form a slurry (e.g., anode slurry, silicon particle slurry, graphite slurry, etc. as shown for example in FIG. 7) quicker than most traditional slurry formation methods. Variants of the technology can produce a slurry in less than an hour (e.g., 10 minutes, 15 minutes, 20 minutes, 30 minutes, 45 minutes, 60 minutes, etc.), whereas other slurry formation methods can require more than an hour (e.g., 2 hours, 4 hours, 6 hours, 8 hours, etc. such as to achieve a slurry with comparable homogeneity, stability, etc. to a slurry as formed in variants of the invention). The rapid slurry formation can be facilitated by the use of milling (e.g., a shaker mill, a ball mill, etc.) in slurry formation, by using water soluble additive(s) (e.g., water soluble CMC, water soluble SBR, etc.), by stepwise mixing components of the slurry (e.g., sequential addition of components interspersed with periods of mixing), and/or can otherwise be facilitated.

Fourth, variants of the technology can form a stable slurry (e.g., all constituents of the mixture remain suspended in solvent, active material remains suspended in the solvent, additives remain suspended in the solvent, etc.) for extended periods of time (e.g., greater than 24 hours, greater than 48 hours, greater than 72 hours, greater than 96 hours, greater than 120 hours, greater than 144 hours, greater than 168 hours, greater than 10 days, greater than 20 days, greater than 30 days, etc.). The stability can be facilitated by removing nucleation sites that can promote sedimentation (e.g., removing bubbles such as by using vacuum), by forming homogeneous mixture (e.g., wherein a local concentration of different constituents of the mixture vary by less than 5%, less than 1%, less than 0.5%, less than 0.1%, etc. for different locations or positions within the slurry as shown for instance in FIG. 8), and/or can otherwise be facilitated. In preferred embodiments of the technology, a dispersant is not needed (e.g., is not used) to form a stable slurry. However, other embodiments can include one or more dispersant (e.g., polymeric amides, block co-polymers, naphthalene sulfonates, lignosulfonates, etc.). The stability can be measured (e.g., monitored, tested, etc.) using zeta potential measurements, using rheological measurements (e.g., viscosity, shear stress, etc.), using optical measurements (e.g., transmittance, reflectance, back scattering, etc.), imaging (e.g., scanning electron micrographs, transmission electron micrographs, etc. of films cast using the mixture), and/or using any suitable measurements (e.g., position-dependent or local measurements within the mixture, global measurements of the mixture, etc.).

However, variants of the technology can confer any other suitable benefits and/or advantages.

3. Silicon Mixture

As shown in FIG. 3, the silicon mixture can include active material 100 (e.g., material that contributes to a capacity of a battery anode such as graphite 120, silicon 110, etc.), one or more additive 200, and optionally solvent 300. Exemplary additives include binders 210, conductive materials 220, stabilizers, crosslinking agents, catalysts, and/or any suitable materials. The silicon mixture is preferably a homogeneous mixture, but can additionally or alternatively be an inhomogeneous mixture.

Figure 4:
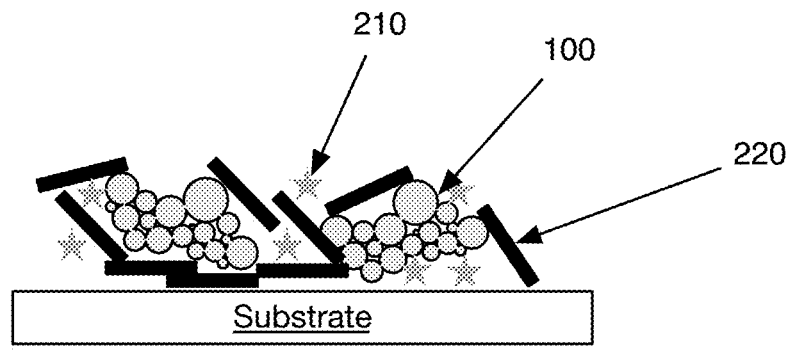
FIG. 4 is a schematic representation of an example of a film made using the silicon mixture.

The silicon mixture is preferably used to form films of silicon (e.g., by removing the solvent from the mixture, as shown for example in FIG. 4). The silicon mixture can additionally or alternatively function to transport silicon materials, stabilize silicon materials (e.g., protect from and/or slow the rate of oxidation of silicon materials), and/or can otherwise function. The films of silicon can be used, for example, in battery anodes, in sensors (e.g., optical sensors, gas sensors, etc.), and/or can be used for any suitable application(s). The silicon films can have any thickness between about 100 nm and 500 μm, but can be thinner than 100 nm or thicker than 500 μm. The silicon films are preferably formed by sequentially adding the silicon mixture and removing solvent from the silicon mixture (e.g., by heating, by modifying an atmosphere or atmospheric pressure proximal the silicon mixture, in a drying oven, in a roll-to-roll process, etc.), but can be formed by continuously adding the silicon mixture (e.g., at a rate that is approximately the same as the rate that the solvent evaporates), using a mold, and/or otherwise be formed. The resulting silicon films preferably have a low specific surface area (e.g., <20 $m^2/g$, <10 $m^2/g$, <5 $m^2/g$, <3 $m^2/g$, <2 $m^2/g$, <1 $m^2/g$, <0.5 $m^2/g$, <0.1 $m^2/g$, etc. such as measured by optical profilometry, atomic micrography, electron micrography, gas adsorption, BET measurement, etc.). However, the resulting silicon films can have a high specific surface area (e.g., >20 $m^2/g$) and/or any suitable specific surface area.

The silicon mixture is preferably a slurry, but can additionally or alternatively include a solution, a dispersion, a suspension, a colloidal suspension, semi-liquid, and/or any suitable mixture. In general, components of the mixture (e.g., the active material, silicon, graphite, binder, conductive materials, additives, etc.) are not dissolved in the solvent. However, one or more components of the mixture can be dissolved in the solvent. For instance, the silicon material can be suspended in the solvent and a binder can be dissolved in the solvent. However, each component can form any suitable mixture and/or interaction(s).

The active material functions to contribute to a capacity of a film cast of the silicon mixture. However, the active material can otherwise function. The active material preferably includes silicon material. The active material can additionally or alternatively include carbonaceous active material (e.g., graphite, carbon nanotubes, graphene, etc.), and/or any suitable materials. In variants that include silicon material and carbonaceous active material, the active material can include between about 5% and 100% silicon material (e.g., where the remainder can be the carbonaceous active material; where the percentage can be a weight percent, volume percent, stoichiometric percent, etc.).

However, in some variations, the active material can only include carbonaceous active material (e.g., to form a graphite slurry) and/or lithium-transition metal material(s) or lithium oxide active material (e.g., to form a cathode slurry such as containing NMC, LCO, LMO, LNMO, LFP, NCA, etc.).

Carbonaceous active material preferably includes graphite particles. However, carbonaceous active material can additionally or alternatively include graphite flakes, graphite shards, carbon nanotubes, graphene, and/or any suitable carbonaceous active material. The graphite particles typically have a characteristic size between about 1-50 μm. However, the characteristic size can be less than 1 μm or greater than 50 μm.

The silicon material can include particles (e.g., solid particles, porous particles, hollow particles, etc. such as nanoparticles, mesoparticles, microparticles, macroparticles, as shown for example in FIGS. 1A-1F, etc.), clusters (e.g., particle aggregates), agglomers (e.g., aggregates of particle aggregates, particle agglomerates, etc.), films, and/or any suitable structures. The silicon material (and/or free silicon thereof) can be amorphous, crystalline (e.g., polycrystalline, monocrystalline, pseudocrystalline, etc.), and/or have any suitable structure.

The surface area of the exterior surface (e.g., an external surface area) of the silicon material (e.g., an exterior surface of the particles, an exterior surface of a cluster of particles, an exterior surface of an agglomer of particles and/or clusters, etc.) is preferably small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof), but can be large (e.g., greater than 50 m$^2$/g) and/or any suitable value.

The (specific) surface area of the interior of the silicon material (e.g., a surface exposed to an internal environment that is separated from with an external environment by the exterior surface, a surface exposed to an internal environment that is in fluid communication with an external environment across the exterior surface, interior surface, etc.) is preferably large (e.g., greater than 10 m$^2$/g, 15 m$^2$/g, 20 m$^2$/g, 25 m$^2$/g, 30 m$^2$/g, 50 m$^2$/g, 75 m$^2$/g, 100 m$^2$/g, 110 m$^2$/g, 125 m$^2$/g, 150 m$^2$/g, 175 m$^2$/g, 200 m$^2$/g, 300 m$^2$/g, 400 m$^2$/g, 500 m$^2$/g, 750 m$^2$/g, 1000 m$^2$/g, 1250 m$^2$/g, 1400 m$^2$/g, ranges or values therebetween, >1400 m$^2$/g), but can be small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof). In some variations, the internal surface area can be less than a threshold surface area (e.g., 200 m$^2$/g, 300 m$^2$/g, 500 m$^2$/g, 750 m$^2$/g, 1000 m$^2$/g, 1500 m$^2$/g, 2000 m$^2$/g, 5000 m$^2$/g, etc.), which can provide a technical advantage of limiting oxidation of the silicon material prior to the formation of an external surface (e.g., with a lower surface area, sealed external surface, etc.). However, there need not be a threshold upper surface area (e.g., by controlling an environment to have less than a target oxygen concentration that can depend on the surface). However, the surface area of the interior can be above or below the values above, and/or be any suitable value.

In some variants, the surface area can refer to a Brunner-Emmett-Teller (BET) surface area. However, any definition, theory, and/or measurement of surface area can be used. The surface area can be determined, for example, based on calculation (e.g., based on particle shape, characteristic size, characteristic size distribution, etc. such as determined from particle imaging), adsorption (e.g., BET isotherm), gas permeability, mercury intrusion porosimetry, and/or using any suitable technique. In some variations, the surface area (e.g., an internal surface area) can be determined by etching the exterior surface of the material (e.g., chemical etching such as using nitric acid, hydrofluoric acid, potassium hydroxide, ethylenediamine pyrocatechol, tetramethylammonium hydroxide, etc.; plasma etching such as using carbon tetrafluoride, sulfur hexafluoride, nitrogen trifluoride, chlorine, dichlorodifluoromethane, etc. plasma; focused ion beam (FIB); etc.), by measuring the surface area of the material before fusing or forming an external surface, and/or can otherwise be determined. However, the surface area (and/or porosity) can be determined in any manner.

In specific examples, the silicon material can have a composition of: Si, $SiO_x$, SiOC, Sic, $Si_xO_xC$, $Si_xO_xC_y$, $SiO_xC_y$, $Si_xC_y$, $SiO_x$, $Si_xO_y$, $SiO_2C$, $SiO_2C_x$, $SiOC_x$, $SiC_z$, $Si_xO_yC_z$, $Si_xO_xC_xZ_x$, $Si_xC_xZ_y$, $SiO_xZ_x$, $Si_xO_xZ_y$, $SiO_2C_z$, $SiO_2C_xZ_y$, and/or have any suitable composition (e.g., include additional element(s)), where Z can refer to any suitable element of the periodic table and x and/or y can be the same or different and can each be between about 0.001 and 2 (e.g., 0.001, 0.005, 0.01, 0.05, 0.1, 0.5, 1, 2, 0.001-0.05, 0.01-0.5, 0.01-0.1, 0.001-0.01, 0.005-0.1, 0.5-1, 1-2, values or ranges therebetween etc.), less than 0.001, or greater than 2. The material composition of the silicon material can be isotropic (e.g., homogeneous distribution of silicon and other additives, dopants, impurities, etc.) and/or anisotropic (e.g., inhomogeneously distributed silicon and other materials such as forming a core-shell like structure). In an illustrative example of an anisotropic material distribution, a surface of the silicon material (e.g., a surface exposed to atmosphere or an environment proximal the silicon material) can have a higher oxygen or silica concentration than an interior of the silicon material (e.g., a volume that is not proximal or exposed to the atmosphere or environment). However, an engineered material gradient and/or any suitable material distribution can exist within the silicon material.

The shape of the particles can be spheroidal (e.g., spherical, ellipsoidal, as shown for example in FIG. 1A, FIG. 1C, FIG. 1F, etc.); rod; platelet; star; pillar; bar; chain; flower; reef; whisker; fiber; box; polyhedral (e.g., cube, rectangular prism, triangular prism, frustopyramidal, as shown for example in FIG. 1E, etc.); frustoconical, have a worm-like morphology (e.g., vermiform, as shown for example in FIG. 1B, etc.); have a foam like morphology; have an egg-shell morphology; have a shard-like morphology (e.g., as shown for example in FIG. 1D); include one or more straight edges (e.g., meeting at rounded corners, at sharp corners, etc. as shown for example in FIG. 1E, etc.) and/or have any suitable morphology.

A characteristic size of the particles is preferably between about 1 nm to about 10000 nm such as 2 nm, 5 nm, 10 nm, 20 nm, 25 nm, 30 nm, 50 nm, 75 nm, 100 nm, 125 nm, 150 nm, 175 nm, 200 nm, 250 nm, 300 nm, 400 nm, 500 nm, 1000 nm, 1500 nm, 2000 nm, 2500 nm, 3000 nm, 4000 nm, 5000 nm, 6000 nm, 7500 nm, 8000 nm, 9000 nm, 9500 nm, 10000 nm, values or ranges therebetween, etc.). However, the characteristic size can additionally or alternatively be less than about 1 nm and/or greater than about 10000 nm. For example, a fused particle and/or cluster (e.g., aggregate) of silicon particles can have a characteristic size between about 1 μm and 10 μm (e.g., 1-3 μm, 3-5 μm, 5-10 μm, 3-10 μm, 3-7 μm, 1-5 μm, 1-7 μm, 0.9-3 μm, 8-12 μm, other values or ranges therein, etc.), and the particles that make up the fused particle and/or cluster can have a characteristic size between about 2 and 500 nm (e.g., 1-10 nm, 10-50 nm, 10-100 nm, 20-200 nm, 50-500 nm, 50-525 nm, 10-550 nm, 100-500 nm, values or ranges therein, etc.). In variations of this example, the fused particle and/or clusters can form tertiary structures (e.g., agglomerates, agglomers, etc.) which can have a characteristic size between about 5-100 μm.

The characteristic size can include the radius, diameter, circumference, longest dimension, shortest dimension, length, width, height, pore size, a shell thickness, and/or any size or dimension of the particle. The characteristic size of the particles is preferably distributed on a size distribution (e.g., where the characteristic size can uniquely define the distribution; can be a moment of the distribution; can be associated with specific percentiles of the distribution such as the D10, D20, D50, D60, D80, D90, etc. size; etc.). The size distribution can be a substantially uniform distribution (e.g., a box distribution, a mollified uniform distribution, etc. such that the number of particles or the number density of particles with a given characteristic size is approximately constant), a Weibull distribution, a normal distribution, a log-normal distribution, a Lorentzian distribution, a Voigt distribution, a log-hyperbolic distribution, a triangular distribution, a log-Laplace distribution, and/or any suitable distribution. The characteristic size distribution of the particles (particularly, but not exclusively for fused particles) is preferably narrow (e.g., standard deviation is less than about 20% of a mean of the size distribution), but can be broad (e.g., a standard deviation greater than about 20% of a mean of the size distribution), and/or can otherwise be characterized. A narrow characteristic size distribution can provide a technical advantage of enhancing a lifetime and/or stability of the silicon material as some undesirable processes depend on a size of the silicon material (and having more uniform size such as with a narrow distribution can lead to more uniform degradation within the sample).

The characteristic size (and its associated distributions) are typically determined directly (e.g., by directly imaging the silicon material such as using scanning electron microscopy, transmission electron microscopy, scanning transmission microscopy, etc.), but can be determined indirectly (e.g., based on scattering experiments such as dynamic light scattering; based on optical properties such as bandgap energy, bandgap width, etc.; based on x-ray scattering such as based on a width of x-ray scattering; etc.), and/or can otherwise be determined.

The silicon material can be crystalline, amorphous, nanocrystalline, protocrystalline, and/or have any suitable crystallinity. When the silicon material (e.g., particles thereof) include crystalline regions, the silicon material is preferably polycrystalline, which can provide a technical advantage of accommodating mechanical or other stresses that the silicon material undergo. However, the silicon material can be monocrystalline. In some examples, the silicon particles can include crystalline regions and noncrystalline regions (e.g., amorphous regions).

In specific examples, the silicon material can be a silicon material as disclosed in U.S. patent application Ser. No. 17/322,487 titled 'POROUS SILICON AND METHOD OF MANUFACTURE' filed 17 May 2021, U.S. patent application Ser. No. 17/525,769 titled "SILICON MATERIAL AND METHOD OF MANUFACTURE' filed 12 Nov. 2021, U.S. patent application Ser. No. 17/824,627 titled 'SILICON MATERIAL AND METHOD OF MANUFACTURE' filed 25 May 2021, each of which is incorporated in its entirety by this reference.

In some variants, the silicon material can be coated. In these variants, the coating can function to modify (e.g., enhance, increase, decrease, etc.) an electrical conductivity of the silicon material, improve the stability of the silicon material (e.g., stability of the silicon, stability of an interfacial layer that forms proximal the surface of the silicon such as a solid electrolyte interphase (SEI) layer, etc.), and/or can otherwise function.

The coating (e.g., coating material, coating thickness, etc.) can be selected based on one or more of: the ability of the coating to form a stable interface between an interfacial layer (e.g., an SEI layer, an active material, a battery surface, etc.) and the silicon, ability to inhibit formation of an interfacial layer (e.g., inhibit formation of an solid-electrolyte interface), coating stability (e.g., stability in an oxidizing environment, stability in a reducing environment, stability in a reactive environment, stability to reaction with specific reactive agents, etc.), electrical conductivity (e.g., electrical conductivity of the coating, target electrical conductivity of the coated silicon, electrical insulative properties, etc.), ion diffusion rate (e.g., $Li^+$ diffusion rate through the coating; ion conductivity), coating elasticity, silicon porosity, silicon expansion coefficient (e.g., external expansion coefficient, external volumetric expansion, etc.), SEI layer formation (e.g., promotion and/or retardation), and/or otherwise be selected.

The coating can attach to an outer surface of the silicon (e.g., a surface of the silicon material exposed to an external environment), infiltrate the pores, coat a portion of the silicon (e.g., portion of the silicon possessing a predetermined quality), coat an interior surface of the silicon, and/or otherwise coat the silicon. The coating thickness is a value or range thereof preferably between about 1 nm and 20 µm such as 1 nm, 2 nm, 3 nm, 5 nm, 10 nm, 20 nm, 30 nm, 50 nm, 100 nm, 200 nm, 500 nm, 1 µm, 2 µm, 5 µm, or 10 µm. However, the coating thickness can be less than 1 nm or greater than 20 µm. The coating thickness can be substantially uniform (e.g., vary by at most 1%, 2%, 5%, 10%, 20%, etc.) or nonuniform over the extent of the silicon material.

The coating material preferably includes carbonaceous material (e.g., organic molecules, polymers, inorganic carbon, nanocarbon, amorphous carbon, etc.), but can additionally or alternatively include inorganic materials, plasticizers, biopolymeric membranes, ionic dopants, and/or any suitable materials. Examples of polymeric coatings include: polyacrylonitrile (PAN), polypyrrole (PPy), unsaturated rubber (e.g., polybutadiene, chloroprene rubber, butyl rubber such as a copolymer of isobutene and isoprene (IIR), styrene-butadiene rubber such as a copolymer of styrene and butadiene (SBR), nitrile rubber such as a copolymer of butadiene and acrylonitrile, (NBR), etc.), saturated rubber (e.g., ethylene propylene rubber (EPM), a copolymer of ethene and propene; ethylene propylene diene rubber (EPDM); epichlorohydrin rubber (ECO); polyacrylic rubber such as alkyl acrylate copolymer (ACM), acrylonitrile butadiene rubber (ABR), etc.; silicone rubber such as silicone (SI), polymethyl silicone (Q), vinyl methyl silicone (VMQ), etc.; fluorosilicone rubber (FVMQ); etc.), and/or any suitable polymer(s). The coating can include a mixture of coating materials, where the ratio and/or relative amounts of the constituents can be selected based on any suitable coating property. In a specific example, the silicon material can be coated in a manner as disclosed in and/or can include a coating as disclosed in U.S. patent application Ser. No. 17/890,863 titled 'SILICON MATERIAL AND METHOD OF MANUFACTURE' filed 18 Aug. 2022 which is incorporated in its entirety by this reference. However, the silicon material can include any suitable coating (including no coating), and/or can be coated in any manner.

The additive(s) can function to modify one or more property of the mixture and/or of a film derived from the mixture. Examples of mixture properties include: viscosity, boiling point, conductivity (e.g., electrical conductivity, thermal conductivity, etc.), solubility (e.g., of the silicon material, of other additives such as a binder), stability (e.g., amount of time the materials remain suspended, stability to chemical reactions, etc.), and/or other properties of the slurry. Examples of film properties include: film adhesion to a surface, film reactivity, film conductivity (e.g., electrical conductivity, thermal conductivity, ion conductivity, etc.), film stability (e.g., resistance to chemical reaction), film thickness (e.g., maximum film thickness, minimum film thickness, etc.), performance properties (e.g., cyclability, energy density, capacitance, etc.), and/or any suitable properties. Examples of additives include: binders (e.g., adhesives), conductive materials, stabilizers, crosslinking agents, catalysts, auditors (e.g., hydrophilic auditors, hydrophobic auditors, etc. which can function to measure, monitor, adjust, etc. a hydrophobicity or hydrophilicity of the mixture), antioxidants, dispersants (e.g., surfactants), electrolytes, metalizing materials, insulating material, semiconducting material, and/or any suitable material(s).

The additives are preferably elastic, but can be rigid, semi-rigid, and/or have any suitable mechanical properties. The additives are preferably ionically conductive (e.g., enable transport of ions such as $Li^+$ with at least an ionic conductivity of 0.1 mS/cm), but can facilitate diffusion of ions, be ionically insulating (e.g., inhibit or slow ion conductivity, have an ionic conductivity less than about 0.1 mS/cm), and/or have any suitable ionic conductivity. The additive(s) are preferably water soluble. However, the additive(s) can be water insoluble, soluble in organic solvent, soluble in inorganic solvent and/or can have any suitable solubility (e.g., in a solvent of the mixture).

The active material to additive ratio (e.g., mass ratio, volume ratio, stoichiometric ratio, etc.) can be any value or range between about 1 part active material to 10 parts additive and 10 parts active material to 1 part additive. For example, the silicon mixture can include between about 10% and 80% silicon material and between about 5% and 85% additive. However, the active material to additive ratio can be 1 part active material to greater than 10 parts additive, greater than 10 parts active material to 1 part additive, and/or any suitable ratio.

The binders preferably function to couple (e.g., bind, generate a retention force between, etc.) the silicon material to a surface (e.g., substrate, current collector, a battery surface, cathode, anode, etc.; bind silicon material to graphite; etc.). The binders can include organic and/or inorganic material. Examples of binders include: carboxymethyl cellulose (CMC), styrene-butadiene rubber (SBR), poly(acrylic acid) (PAA), sodium alginate (SA), polyvinylidene fluoride (PVDF), polyaniline (PANI), poly(9,9-dioctylfluorene-co-fluorenone-co-methyl benzoic ester) (PFM), polytetrafluoroethylene (PTFE), poly(ethylene oxide) (PEO), polyvinyl alcohol (PVA), polyacrylonitrile (PAN), sodium carboxymethyl chitosan (CCTS), poly(3,4-ethylenedioxythiophene) polystyrene sulfonate (PEDOT:PSS), 3,4-propylenedioxythiophene (ProDOT), dopamine hydrochloride, polyrotaxanes, polythiophene, combinations thereof, and/or any suitable binder.

In an illustrative example, an CMC/SBR binder can be used. In variations of this illustrative example, a ratio (e.g., weight ratio, volume ratio, stoichiometric ratio, etc.) of CMC to SBR can be 10:1, 5:1, 3:1, 2:1, 1:1, 1:2, 1:3, 1:5, 1:10, 1:1, 2:3, 2:5, 2:7, 3:2, 3:5, 3:7, 5:2, 5:3, 5:4, 5:6, 5:7, and/or any suitable ratio between 10:1 and 1:10. However, any suitable ratio of CMC to SBR can be used.

In some variants, the binder can be the same as (e.g., the same material as) the coating on the silicon material. In these variants, the coating can function as binder, the binder can form a coating on the silicon material, and/or the coating and binder can otherwise be used. However, a separate coating and binder can be used.

The conductive material preferably functions to ensure that films of the silicon material have a substantially uniform electrical conductivity, but can otherwise function (e.g., to improve a local electrical conductivity, to improve electrical conductivity between silicon material and graphite, etc.). For example, the conductive material can be added to modify an electrical conductivity of the silicon film to be at least about 10,000 siemens/meter ($S*m^{-1}$), can modify a resistivity of the silicon film to be at most about $10^{-4}$ n m, and/or can otherwise modify an electrical property of the silicon film and/or silicon mixture.

The conductive material preferably includes carbonaceous material(s) (e.g., organic, inorganic carbon, nanocarbon, polymeric, organo-metallic, etc.), but can additionally or alternatively include inorganic material(s) (e.g., noncarbonaceous material, metal(s), etc.). Examples of conductive materials include: carbon super P, acetylene black, carbon black (e.g., C45, C65, etc.), mesocarbon microbeads (MCMB), graphene, carbon nanotubes (CNTs) (e.g., single walled carbon nanotubes, multiwalled carbon nanotubes, semi-conducting carbon nanotubes, metallic carbon nanotubes, etc. which can be beneficial as CNTs can contribute to a capacity of the silicon film), reduced graphene oxide, graphite, graphitic oxides, fullerenes, combinations thereof, and/or any suitable material(s).

In some variants, the conductive material can be the same as (e.g., the same material as) the coating on the silicon material and/or the binder. In these variants, the coating can function as conductive material, the conductive material can form a coating on the silicon material, the binder can function as conductive material, the conductive material can function as a binder, a separate binder and conductive material can be used, and/or the binder, coating, and conductive material can be otherwise related. However, a separate coating and conductive material can be used. Similarly, the conductive material can be the same as an active material (e.g., graphite of the active material), where the conductive material can have a different form factor, aspect ratio, shape, etc. compared to the active material.

In variants that include dispersants (e.g., surfactants), the dispersants can function to decrease aggregation of particles, increase hydrophilicity of materials (e.g., of a silicon material), increase a stability of the mixture (e.g., duration that solids remain suspended in the solvent), and/or can otherwise function. The dispersants are preferably less than 1% (e.g., by mass, by volume, by stoichiometry, etc.) of the mixture. However, the dispersants can be greater than 1% of the mixture. Exemplary dispersants include: polymeric amides, block co-polymers, naphthalene sulfonates, lignosulfonates, and/or any suitable surfactant(s).

The solvent can function as a carrier for the mixture of the silicon material and/or other components (e.g., additives, binder, conductive material, etc.). The solvent is preferably a low boiling point solvent, but can be a high boiling point solvent. The solvent can be protic or aprotic. The solvent is preferably polar, but can be apolar. The solvent preferably has a high ionic conductivity (e.g., greater than about 0.1 mS/cm), but can have a low ionic conductivity (e.g., less than about 0.1 mS/cm) or any suitable ionic conductivity. The solvent is preferably water (e.g., includes water, includes only water, comprises water, consists of water, consists essentially of water, etc.). However, the solvent can additionally or alternatively include an alcohol (e.g., methanol, ethanol, isopropyl alcohol, 1-propanol, 1-butanol, 2-butanol, isobutanol, etc.), inorganic solvent, and/or other organic solvents (e.g., ethers, esters, thiols, aldehydes, ketones, aromatic compounds, hydrocarbons, alkanes, alkenes, alkynes, etc.). Examples of solvents include: ethanol, isopropanol, n-butanol, hexane, cyclohexanone, ethylene glycol (ethan-1,2-diol), toluene, polyester, propylene glycol, acetone, water, ethyl cellulose, formamide, 2-methoxyethanol, methanol, polyacrylic acid, xylene, dimethyl sulfoxide (DMSO), dioxolane, chloroform, m-cresol, ethylene carbonate (EC), propylene carbonate (PC), polyethylene glycol (PEG), dimethyl carbonate (DMC), glycerol, diethyl carbonate (DEC), n-methylpyrrolidone (NMP), and/or any suitable solvent(s).

The solvent can include a mixture of solvents. The mixture of solvents (e.g., which solvents are mixed, the ratio of solvent, etc.) can be chosen to achieve a target boiling point, to enable a predetermined evaporation rate (e.g., based on evaporation conditions), to enable a target solubility for one or more components, and/or can otherwise be determined. In an illustrative example, a solvent mixture can include ethanol and water (e.g., with a mass ratio, volume ratio, stoichiometric ratio, etc. of ethanol to water of between about 100:0 and 0:100).

In a first specific example, the solid content of the silicon mixture (e.g., silicon material, additives, etc.) can be between about 10% and 90%, where the remainder of the silicon mixture can be solvent.

In a second specific example, the silicon mixture (e.g., solid content of the silicon mixture) can include: an active material content between 15-90%, a conductive material content between about 5-20%, and a binder content between about 5-10%, where content can refer to a mass fraction, a volume fraction, a stoichiometric fraction, and/or content can otherwise be defined.

In a third specific example, the silicon mixture (e.g., solid content of the silicon mixture) can include: an active material content between 1-80%, a conductive material content between about 0-85%, and a binder content between about 1-20%.

However, the silicon mixture can include any suitable composition.

4. Method.

As shown for example in FIG. 6, the method can include optionally reducing a silica precursor S100, optionally fusing silicon material, mixing the silicon material, optionally casting a film using the silicon mixture, and/or any suitable steps. The method preferably functions to prepare a silicon mixture (e.g., a silicon mixture as described above). However, the method can additionally or alternatively perform any suitable function (e.g., can form a graphite slurry, a cathode slurry such as including a lithium transition metal oxide, lithium oxide, conductive additive, binder, etc.).

The method and/or steps thereof can be performed in a single chamber (e.g., a furnace, an oven, milling chamber, etc.) and/or in a plurality of chambers (e.g., a different chamber for each step or substep, a heating chamber, a coating chamber, a milling chamber, a comminution chamber, a fusion chamber, a washing chamber, etc.). The method can be performed on a laboratory scale (e.g., microgram, milligram, gram scale such as between about 1 μg and 999 g), manufacturing scale (e.g., kilogram, megagram, etc. such as between about 1 kg and 999 Mg), and/or any suitable scale.

The method can use a silica starting material (e.g., in variants of the method that reduce the silica to silicon, variants of the method that include step S100, etc.), a silicon starting material (e.g., in variants of the method that do not include S200, in variants of the method that do not include S100, etc.), silicon carbide (and/or other alloys, composites, materials, etc. that include silicon and carbon), and/or any suitable material. The starting materials can be derived from waste materials (e.g., silica, silicon, etc. generated as a byproduct from another process), recycled materials (e.g., reusing silica, silicon, etc. from another use), pristine materials (e.g., newly manufactured silica, silicon, etc.), and/or any suitable starting material. Examples of a silica starting material include: sol-gel silica (e.g., silica prepared according to the Stöber method), fume silica, diatoms, glass, quartz, fumed silica, silica fumes, Cabosil fumed silica, aerosil fumed silica, sipernat silica, precipitated silica, silica gels, silica aerogels, decomposed silica gels, silica beads, silica sand, silica dust, and/or any suitable silica. Examples of silicon starting materials include: silicon shards, high-purity (e.g., with a silicon composition greater than 90%, 95%, 97.5%, 98%, 99%, 99.5%, 99.9%, 99.99%, 99.995%, 99.999%, etc. by weight, by mass, by volume, by atomic purity, etc.) silicon particles, silicon particle waste from silicon wafer production, silicon dust, recycled silicon solar cells, silicon sludge, silicon debris, silicon particles (e.g., silicon nanoparticles, silicon microparticles, silicon macroparticles, silicon materials disclosed in U.S. patent application Ser. No. 17/322,487 titled 'POROUS SILICON AND METHOD OF MANUFACTURE filed 17 May 2021, U.S. patent application Ser. No. 17/525,769 titled 'SILICON MATERIAL AND METHOD OF MANUFACTURE' filed 12 Nov. 2021, U.S. patent application Ser. No. 17/667,361 titled 'SILICON MATERIAL AND METHOD OF MANUFACTURE' filed 8 Feb. 2022, each of which is incorporated in its entirety by this reference, etc.), and/or any suitable silicon.

Reducing silica S100 functions to reduce a silica starting material to silicon. S100 can additionally or alternatively function to introduce pores in the silica material (e.g., by forming porous silicon from solid silica), and/or otherwise function. The resulting silicon can retain have a different structure from the structure of the starting silica material and/or substantially the same structure as the starting silica material.

Reducing the silica starting material can include: purifying the silica starting material, exposing the silica starting material to one or more reaction modifiers (e.g., salt such as sodium chloride, reducing agent such as magnesium or aluminium, etc.), purifying the silica and reaction modifier mixture, comminuting the silica starting material, reducing the silica starting material (e.g., via a magnesiothermal reduction, via an aluminothermic reduction, etc. such as at a temperature between about 500-1100° C.), purifying the resulting silicon, processing the resulting silicon, and/or any suitable steps. In an illustrative example, reducing the silica and/or steps thereof can include any steps or processes as disclosed in U.S. patent application Ser. No. 17/097,774 titled 'METHOD OF MANUFACTURE OF POROUS SILICON' filed 13 Nov. 2020, which is incorporated in its entirety by this reference. However, reducing the silica starting material can be performed in any steps.

Fusing the silicon material S200 functions to decrease an external surface area of the silicon material (e.g., while retaining a high internal porosity, high internal surface area, etc.) which can be beneficial for increasing a lifetime of the silicon material, for decreasing degradation, oxidation, and/or other silicon material reactions, and/or can otherwise be beneficial. The silicon material is preferably fused in a fusion chamber (e.g., milling chamber), but can be fused in any suitable chamber and/or compartment. The silicon material can be fused in the same and/or a different chamber from a reducing chamber (e.g., as used in S100).

The silicon material is preferably fused using a comminution method (e.g., grinding, milling, etc.). However, the silicon material can be fused thermodynamically (e.g., melting, vaporizing, etc.), electrolytically, chemically (e.g., using a coating, binder, adhesive, etc.), and/or in any manner. The comminution method can be performed continuously (e.g., without stopping the comminution process for a threshold time, changing a speed without setting the speed to zero, etc.) and/or intermittently (e.g., with breaks during the comminution process such as 5 minutes of comminuting, 1 minute break; 5 minutes of comminution, 5 minutes of break; 5 minutes of comminution, 10 minutes of break; etc.). Whether the comminution process is continuous or intermittent can depend on a particle property (e.g., size, shape, porosity, etc.), a target particle shape (e.g., size, shape, porosity, specific surface area, etc.), a comminution speed, a fill volume (and/or fill mass), and/or any suitable property and/or parameter.

As a first illustrative example, silicon particles can be fused by ball milling (e.g., in a cryogenic mill) the silicon particles continuously at about 900 rpm for about 1 hour. In a second illustrative example, silicon particles can be fused by intermittently ball milling the silicon particles at 50o rpm for 5 to 10 minutes alternating with 1 to 10 minutes of not comminuting the silicon particles (e.g., for a total time or total active time of about 1 hour). As a third illustrative example, fusing the silicon particles can be performed as disclosed in U.S. patent application Ser. No. 17/824,627 titled 'SILICON MATEERIAL AND METHOD OF MANUFACTURE' filed 25 May 2022 which is incorporated in its entirety by this reference. However, the silicon material can be fused in any manner.

Mixing the silicon material S300 preferably functions to form a homogeneous mixture. However, S300 can form an inhomogeneous mixture and/or any suitable mixture. S300 can be performed in the same chamber as or a different chamber from S200. During mixing, the mixing chamber can be heated (e.g., to a temperature above room temperature such as 50° C., 100° C., 150° C., 200° C., 300° C., etc.), cooled (e.g., to minimize local heating during a mixing process such as to 10° C., 0° C., −20° C., −80° C., −200° C., etc.), can be maintained at or near room temperature (e.g., with passive or activate temperature control to maintain a temperature between about 15-40° C. and/or any subrange therewithin), and/or can fluctuate.

Different components of the silicon mixture (e.g., target silicon mixture) are preferably added (and incorporated or mixed together) separately (e.g., sequentially). However, in some variants, multiple components can be added simultaneously and/or with any suitable order and/or timing. Mixing can be stopped and/or continue during the addition of each component. For instance, mixing can be performed for a predetermined amount of time between adding each component.

In variants where different components are added sequentially, each separate addition can be referred to as a mixing step (e.g., milling step, comminution step, etc.). In a specific example, active material can be mixed followed by addition of conductive additive and a second mixing step, followed by a first binder and a third mixing step, followed by a second binder and a fourth mixing step. In variants of the specific example, the first and second binder can be mixed at the same time (e.g., resulting in only 3 mixing steps), the first and/or second binder can be mixed before the conductive additive, the conductive additive can be mixed at the same time as the active material (e.g., resulting in only 2 or 3 mixing steps), and/or the constituents can be mixed in any order (e.g., conductive additive and/or one or more binders before the active material).

Components can be added to the mixing chamber as solids, as liquids, as solutions, as suspensions, and/or in any suitable form. For instance, polymeric constituents (e.g., CBC, SBR, etc.) can be added as a solid, heated to a temperature above a melting temperature of the polymer (e.g., to add the polymer as a liquid), can be dissolved in a solvent (e.g., a solvent mixture such as the same as the target solvent, such that the added solvent produces the target solvent, in water, in ethanol, etc.; a different solvent such as a solvent with a low vapor pressure, a solvent that is readily separated from the solvent of the mixture, etc.), and/or can be added in any manner.

The mixing can be performed wet (e.g., mixing, milling, sonicating, etc. in the presence of the solvent(s) of the silicon mixture, in the presence of a separate solvent, etc.) and/or can be performed dry (e.g., in the absence of solvent). In some embodiments, a first mixing step can be performed dry, and a second (and subsequent) mixing step can be performed wet. In another embodiment, a first mixing step can be performed in a first solvent and a second mixing step (where there can be intermediate mixing steps between the first and second mixing step) can be performed in a second solvent. In a third embodiment, performed wet and a second mixing step can be performed dry. However, the mixing can be performed in any suitable manner.

Figure 9A:
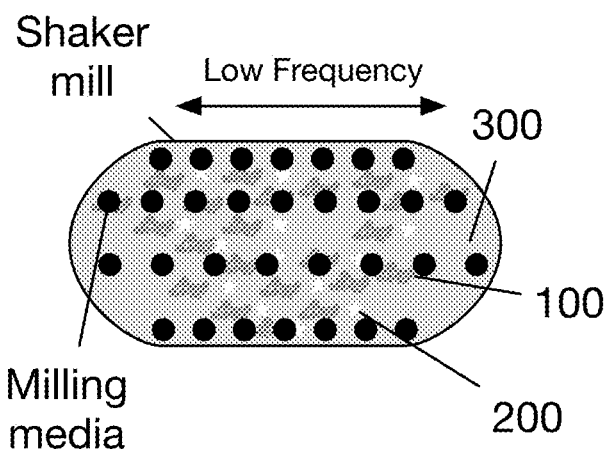
FIGS. 9A, 9B, and 9C are schematic representations of examples of mixing an active material with an additive (e.g., one or more binders, one or more conductive additives) in a shaker mill. In the examples of FIG. 9A and FIG. 9B the same grinding jar (e.g., milling jar, shaker jar, etc.) is used below and above a threshold shaking frequency (e.g., 1 Hz, 5 Hz, 10 Hz, 15 Hz, 20 Hz, 25 Hz, 30 Hz, etc.) showing a transition from primary milling media motion parallel to the shaking vector to substantially random (e.g., chaotic, apparently random, etc.) milling media motion relative to the shaking vector.
Figure 9B:
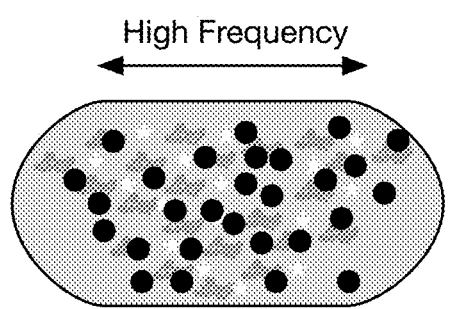
Figure 9C:
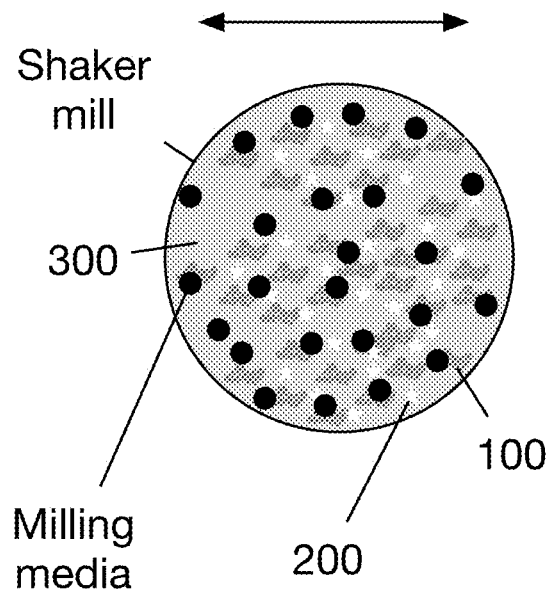

The components of the silicon mixture are preferably mixed via milling (e.g., ball milling, shaker mill, as shown for example in FIG. 2, as shown for example in FIGS. 9A-9C, etc.) and/or using sonication. However, the components of the silicon mixture can additionally or alternatively be mixed using high shear blending, and/or using any suitable techniques.

Figures 10A, 10B:
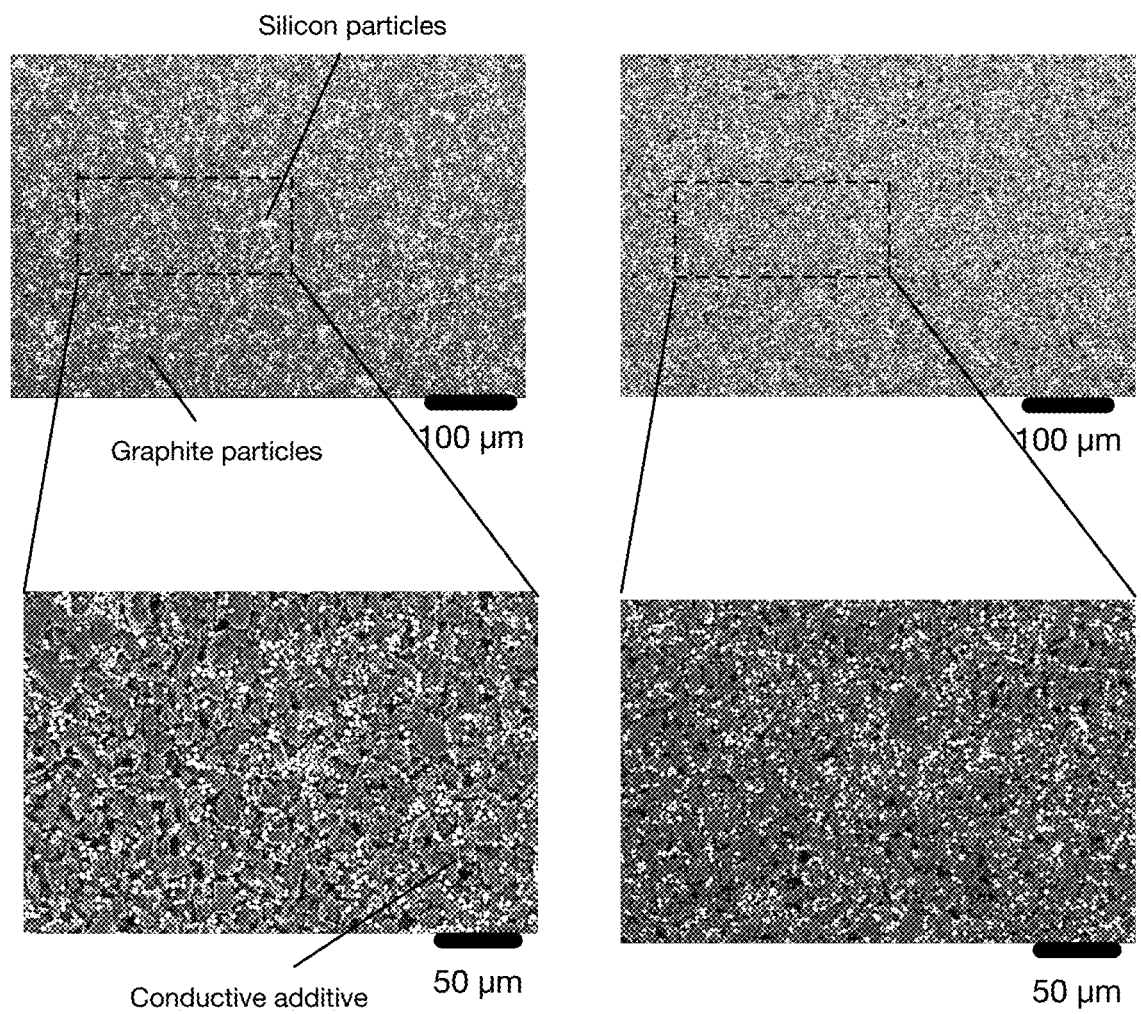
FIGS. 10A and 10B show scanning electron micrographs of examples of films cast from a silicon mixture from top and side views for silicon mixtures that were not sonicated (FIG. 10A) or that were sonicated (FIG. 10B) prior to (and/or during the mixing process) further component mixing.
Figure 11:
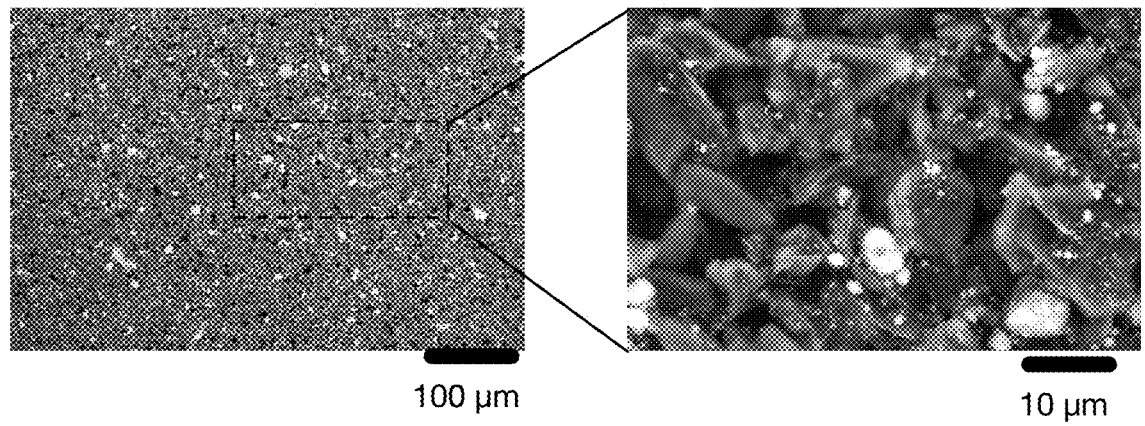
FIGS. 11 and 12 are scanning electron micrographs of examples of films cast from silicon mixtures with variants of silicon materials.
Figure 12:
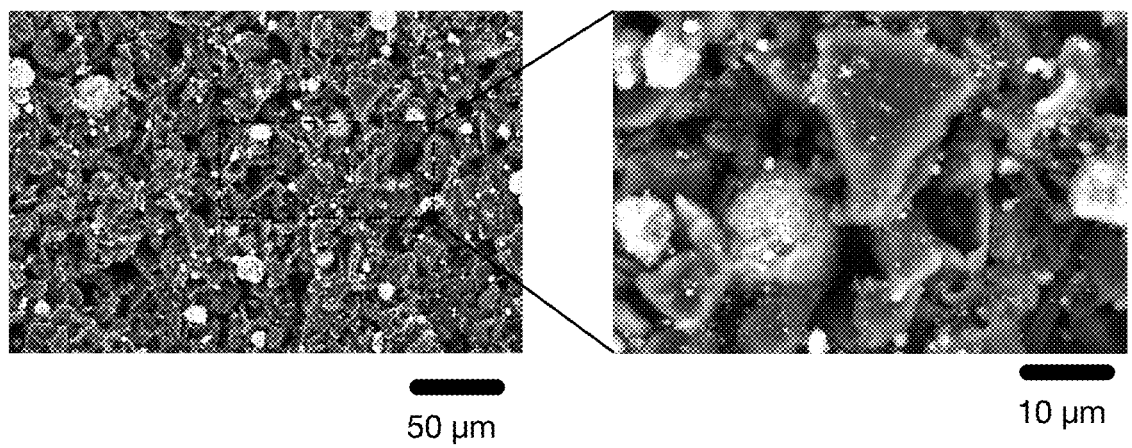

In variants of mixing the silicon mixture that include sonication, sonication is preferably performed before milling. However, sonication can be performed simultaneously with and/or after milling. Sonication can be particularly beneficial for breaking apart and/or limiting formation of aggregates of the silicon material and/or carbon material. For example (as shown in FIG. 10A), films cast from slurries formed without sonication show less homogeneity and larger regions of carbon (e.g., conductive additive) aggregation and/or silicon aggregation compared to a slurry made using the same materials including sonication (e.g., as shown in FIG. 10B). However, sonication can otherwise be beneficial. However, sonication can be performed during and/or after milling and/or can be performed without milling the components. The sonication can be performed using a horn sonicator (e.g., with a transducer area ~1 mm$^2$), an array of ultrasonic emitters, a linear ultrasonic probe, an areal ultrasonic probe, a sonication bath, and/or using any suitable sonication mechanism.

A sonication time is typically kept short (e.g., less than or equal to 30 s, less than or equal to about 1 minute, less than or equal to 5 minutes, less than or equal to 10 minutes, etc.), which can help minimize or hinder material degradation, deformation, and/or otherwise perturbing a materials properties and/or structure. However, the sonication time can be long (e.g., greater than about 10 minutes). The sonication frequency is preferably a frequency and/or range thereof between 15-68 kHz, such as 25 kHz; however, any suitable frequency can be used. The intensity of the sonication waves (e.g., ultrasonic waves) emitted is typically between 100-2400 W; however, any suitable intensity can be used.

In a first variant, dry powders can be sonicated together. For instance, silicon particles can be sonicated with carbon particles (e.g., graphite). In some variations, conductive additive can additionally be sonicated with the silicon particles and the carbon particles. In a second variant, materials of the silicon mixture can be sonicated in the presence of a sonication solvent. In a specific example of the second variant, a silicon material (e.g., silicon particles) can be sonicated with carbon material (e.g., graphite particles) in alcohol (e.g., isopropyl alcohol, ethanol, methanol, butanol, etc.), where alcohol can be a preferred solvent as the silicon material is often hydrophobic. However, water can be used (particularly but not exclusively in variants that include a dispersant, surfactant, etc. in the mixture) and/or any suitable sonication solvent (e.g., a solvent as discussed above) can be used. In some variations, conductive additive can additionally be sonicated with the silicon material and the carbon material. In the second variant, the sonication solvent is typically removed (e.g., by evaporation, filtration, etc.) before subsequent mixing. However, the sonication solvent can be used for subsequent mixing steps and/or for the slurry (e.g., where the sonication solvent is the same as the mixture solvent).

In a specific example, the milling can be performed at a low speed (e.g., 50-500 rpm), which can be beneficial for avoiding spherification and/or otherwise perturbing a morphology of silicon particles.

The silicon is preferably milled (e.g., comminuted) according to a set of milling properties (e.g., comminution properties). The set of milling properties can include: weight ratio (e.g., of balls to silicon material), milling speed, milling time, mill type, milling container, grinding medium (e.g., type, material, shape, size, size distribution, comminution medium, etc.), volume percentage of material filling in the container, milling temperature (e.g., comminution temperature), milling atmosphere (e.g., comminution atmosphere), milling agents (e.g., one or more chemicals added with the silicon during the milling process such as to enhance the milling process, to modify the resulting silicon, comminution agent, etc.), milling jar temperature, and/or any suitable properties. The milling properties can be selected based on target silicon properties (e.g., characteristic size, characteristic size distribution, shape, etc.), initial silicon properties (e.g., characteristic size, characteristic size distribution, shape, etc.), a target energy provided to the powder (e.g., the silicon and/or milling agents to be milled), a target amount of processing time, and/or otherwise be selected.

The weight ratio (e.g., the ratio between the weight of the balls and the weight of the silicon and/or other comminuted materials) is preferably between 1:1 and 250:1 (such as 5:1, 10:1, 20:1, 50:1, 100:1, 150:1, 200:1, etc.), but can be less than 1:1 or greater than 250:1. In general, higher weight ratios provide higher energy and shorter milling time to reach desired silicon properties. However, the weight ratio can be otherwise related or tuned in response to the target silicon properties.

The milling speed (e.g., comminution speed) is preferably a value or range between about 1-2500 rpm (e.g., 100, 200, 300, 400, 500, 600, 700, 800, 900, 1000, 1200, 1500, 1750, 2000, 2500, values or ranges therebetween, etc.), but less than 1 rpm or greater than 2500 rpm. In general, higher milling speed provides more energy to the powder (e.g., silicon, milling agents, etc.). As a first specific example, a silicon material can be milled (e.g., continuously milled) at about 900 rpm (e.g., 750-1000 rpm). As a second illustrative example, a silicon material can be milled (e.g., continuously milled, intermittently milled) at about 500 rpm (e.g., 350-600 rpm) which can be beneficial for scaling silicon material comminution (e.g., as larger mills can be more likely to be able to achieve slower milling speed). However, the milling speed can be otherwise related or tuned in response to the target silicon properties.

The milling time (e.g., comminution time) is preferably an amount or range of time between 1 min and 1000 hours (such as 1-24 hours), but can be less than 1 min or greater than 1000 hours. The milling time can be a contiguous milling time (e.g., a continuous milling time), a total milling time (e.g., including time spent not milling the material such as to allow the material to cool), a total amount of time that the mill is operable for (e.g., an amount of time that does not include periods of time that the mill is not operating), and/or any suitable time. When the powder is milled intermittently, the milling can be performed with a predetermined frequency, with a predetermined period, with random timing, according to a milling schedule, and/or with any suitable timing.

The silicon material is preferably comminuted continuously (e.g., without interruption); however, the silicon material can be comminuted intermittently (e.g., with interruptions). Whether a silicon material is comminuted with or without interruptions can depend on the silicon material, the comminution speed (e.g., higher speeds such as 900 rpm can favor continuous comminution, lower speeds such as 350 or 500 rpm can favor intermittent comminution, etc.), target comminuted silicon properties (e.g., characteristic size, void spaces, porosity, etc.), comminution temperature, and/or any suitable properties. As an illustrative example of an intermittent comminution, the silicon material can be comminuted for 1-10 minutes and then rested for 1-10 minutes (which can be beneficial for reducing a temperature of the silicon material and/or comminution container such as to prevent a heat build-up within the comminution container), repeated for a total time of 1-5 hours. Intermittent comminution can have a duty cycle between 1% and 99% (e.g., 1% of the time actively comminuting to 99% of the time with active comminution), and/or can have any suitable duty cycle. When the silicon is comminuted intermittently, the silicon is preferably comminuted for a greater amount of time that the silicon material is rested (e.g., not comminuted). For example, a silicon material can alternate between being comminuted for a comminution time (e.g., 10 min, 20 min, 30 min, 45 min, 60 min, 2 hr, 4 hr, 6 hr, 8 hr, 12 hr, 24 hr, values or ranges therebetween, etc.) and resting for a resting time (e.g., 1 min, 2 min, 3 min, 4 min, 5 min, 10 min, 15 min, 20 min, 30 min, 45 min, 60 min, 2 hr, 4 hr, 6 hr, 8 hr, 10 hr, 12 hr, 24 hr, values or ranges therebetween, etc.). Comminution and resting can be alternated a predetermined number of times (e.g., once, twice, thrice, 5×, 10×, etc.), until a target time has elapsed, until a target parameter is achieved (e.g., target temperature, target product release, etc.), until a target silicon material property (e.g., particle size, surface area, etc.), and/or until any suitable criteria is met. In an illustrative example, silicon particles can be comminuted for about 1 hour (e.g., 50-70 minutes), rested for about 3 minutes (e.g., 1-5 minutes). In this illustrative example, the total comminution time can be about 3 hours (e.g., 3 comminution and resting cycles). However, any suitable comminution parameters (e.g., comminution time, resting time, etc.) can be used.

Examples of mill types include: shaker mills, planetary mills, attritors, uni-ball mills, IsaMills, rod mills, stamp mills, arrastras, pebble mills, SAG mills, AG mills, tower mills, Buhrstone mills, VSI mills, attritors, high energy ball mill, horizontal ball mill, and/or any suitable mill and/or milling technique can be used. In an illustrative example, a shaker mill with a flat-ended vial (e.g., comminution container with a rectangular shaped cross-section) or a rounded-ended vial (e.g., comminution container with a stadium shaped cross-section) can be used.

The weight ratio (e.g., the ratio between the weight of the milling media and the weight of the mixture) is preferably between 1:1 and 250:1 (such as 5:1, 10:1, 20:1, 50:1, 100:1, 150:1, 200:1, etc.), but can be less than 1:1 or greater than 250:1.

The comminution speed (e.g., milling speed) is preferably a value or range between about 1-2500 rpm (e.g., 100, 200, 300, 400, 500, 600, 700, 800, 900, 1000, 1200, 1500, 1750, 2000, 2500, values or ranges therebetween, etc.), but less than 1 rpm or greater than 2500 rpm.

The comminution time (e.g., milling time) is preferably an amount or range of time between 1 min and 1000 hours (such as 1-24 hours), but can be less than 1 min or greater than 1000 hours. The milling time can be a contiguous milling time (e.g., a continuous milling time), a total milling time (e.g., including time spent not milling the material such as to allow the material to cool), a total amount of time that the mill is operable for (e.g., an amount of time that does not include periods of time that the mill is not operating), and/or any suitable time. When the mixture is milled intermittently, the milling can be performed with a predetermined frequency, with a predetermined period, with random timing, according to a milling schedule, and/or with any suitable timing.

The comminution frequency (e.g., milling frequency, shaking frequency, etc.) is preferably between about 0.1 Hz and 100 Hz (e.g., 0.5 Hz, 1 Hz, 5 Hz, 10 Hz, 15 Hz, 20 Hz, 25 Hz, 30 Hz, 40 Hz, 45 Hz, 50 Hz, 60 Hz, 70 Hz, 80 Hz, 90 Hz, 95 Hz, values or ranges therebetween, etc.). However, the comminution frequency can be less than 0.1 Hz or greater than 100 Hz.

The comminution container (e.g., milling container) can be made of or include: steel, including hardened steel, tool steel, hardened chromium steel, tempered steel, stainless steel, tungsten carbide cobalt (WC—Co), WC-lined steel, bearing steel, copper, titanium, sintered corundum, yttria-stabilized zirconia (YSZ), sapphire, agate, hard porcelain, silicon nitride (e.g., $Si_3N_4$), and/or any suitable materials. The comminution container can be the same or different from the reducing chamber. The comminution container volume can be between $10^{-6}$ $m^3$ and 1 $m^3$, but can be smaller than $10^{-6}$ $m^3$ or larger than 1 $m^3$. A cross-section of the comminution container (e.g., in a plane parallel to a plane of motion of milling material, in a plane perpendicular to a plane of motion of milling material, etc.) can be quadrilateral (e.g., square, rhombus, rectangular, etc.), oval, circular, elliptical, stadium-shaped, ovoid, rounded (e.g., polygons with one or more rounded corners), spherical polygons, parabolic, hyperbolic, and/or can have any suitable shape (e.g., where the shape can depend on a motion profile of the milling medium).

The comminution container can be cooled (e.g., to a temperature below room temperature such as 10° C., 0° C., −10° C., −20° C., −50° C., −100° C., −200° C., −250° C., values or ranges therebetween, etc.), heated (e.g., to a temperature above room temperature such as 45° C., 50° C., 60° C., 75° C., 100° C., 150° C., 200° C., 300° C., 500° C., 1000° C., etc.), maintained at or near room temperature (e.g., a temperature between about 10 and 45° C. or a temperature or temperature therein such as using active or passive temperature control such as heat sinks, heat sources, PI controllers, PID controllers, etc.), and/or can fluctuate (e.g., be uncontrolled, be passively controlled based on a duration of milling, milling intermittency, etc.).

The volume of the comminution container is preferably filled (e.g., with grinding medium, with powder, with additives, etc.) to a value or range between about 1-99% (e.g., 50%) of the total volume of the milling container, but the milling container can be less than 1% or greater than 99% filled.

The milling medium 410 (e.g., comminution medium, milling medium, grinding medium, etc.) can be made of or include: hardened steel, tool steel, hardened chromium steel, tempered steel, stainless steel, tungsten (W), tungsten carbide (WC), tungsten carbide-cobalt (WC—Co), WC-lined steel, bearing steel, copper (Cu), titanium (Ti), sintered corundum, yttria-stabilized zirconia (YSZ), sapphire, agate, hard porcelain, silicon nitride ($Si_3N_4$), and/or any suitable material(s). Tungsten based comminution medium (e.g., milling medium) can be beneficial for avoiding or limiting an amount of introduced impurities and/or contaminants. However, any milling media can be suitable and/or beneficial (e.g., for having a lower cost). The size (e.g., radius, diameter, circumference, characteristic size, largest dimension, smallest dimension, etc.) of the grinding medium (e.g., grinding balls) is preferably a value or range between 100 nm and 10 cm (e.g., 100 nm, 300 nm, 500 nm, 1 μm, 3 μm, 5 μm, 10 μm, 30 μm, 50 μm, 100 μm, 300 μm, 500 μm, 1 mm, 3 mm, 5 mm, 10 mm, 30 mm, 50 mm, 100 mm, values or ranges therebetween, etc.), but can less than 100 nm or greater than 10 cm. The grinding medium is preferably ball shaped (e.g., spherical, spheroidal, etc.), but can be elliptical, ovate, polyhedral, and/or have any suitable shape.

The comminution atmosphere (e.g., milling atmosphere) is preferably a vacuum and/or an inert atmosphere (e.g., includes helium, nitrogen, neon, krypton, argon, xenon, radon, cardon dioxide, or other gases that do not react with or have a low reaction with silicon and/or other materials of the mixture), which can function to inhibit (or prevent) nitride, oxide, hydride, oxynitride, and/or other species formation. However, the comminution atmosphere can additionally or alternatively include one or more reactive species (e.g., reactive nitrogen species, reactive oxygen species, oxygen, ozone, halogens, hydrogen, carbon monoxide, methane, ethane, ethene, ethyne, carbon sources, reducing agent, oxidizing agent, etc.).

A pressure of the comminution atmosphere (e.g., milling atmosphere) is preferably less than standard pressure (e.g., less than about 760 Torr such as controlled using an exhaust, vacuum pump, etc.) which can be beneficial for removing dissolved gases from the solvent, hindering formation of and/or removing bubbles from the mixture (e.g., slurry), additional mixing (e.g., resulting from bubble formation and evacuation through the solvent), removing solubilizing agents used to disperse a mixture constituent (e.g., remove acetone or other organic solvents used to dissolve a component of the mixture), and/or can otherwise be beneficial. For instance, the milling pressure can be less than 10 Torr, 10 Torr, 100 Torr, 200 Torr, 500 Torr, 700 Torr, 720 Torr, 750 Torr, values therebetween, and/or any suitable pressure.

The components can be milled continuously (e.g., with additional components added at predetermined times while milling) and/or intermittently (e.g., stop comminution to add additional components before resuming comminution, intermittently milling during a comminution step such as to avoid exceeding a threshold temperature, etc.). For different comminution steps (e.g., during different constituent addition) the comminution parameters can be the same or different. As a specific example, a first comminution step can be performed at a first comminution frequency and a second comminution step can be performed at a second (e.g., different) comminution frequency. As a second specific example, a first comminution step can be performed for a first comminution time or duration and a second comminution step can be performed for a second (different) comminution time or duration. As a third specific example, a first comminution step can be performed with a first comminution pressure (e.g., vacuum pressure, milling pressure, etc.) and a second comminution step can be performed with a second (different) comminution pressure. Similarly, additional comminution steps can be performed with the same or different parameters (e.g., a third step can have the same parameters as the first or second comminution step, the third step can have different parameters from the first and second comminutions steps, and so forth for any suitable number of comminution steps).

However, additionally or alternatively, the components can be mixed using agitation, stirring, sonication, and/or any suitable mixing process can be used.

The method can optionally include casting the mixture as a film, which can function to form a film (e.g., electrode, anode, cathode, etc.) from the mixture. The mixture can be drop cast, spray cast, doctor-bladed, spin cast, and/or cast as a film in any manner. In variants, casting the mixture as a film can include: depositing (e.g., dropping) the mixture on a substrate (e.g., a current collector), calendering the deposited mixture (e.g., to a target specific surface area of the film, to a target film thickness, etc.), drying the deposited mixture (e.g., by heating the deposited mixture, by decreasing a humidity proximal the deposited mixture, by blowing dry air over or through the deposited mixture, etc.), and/or can include any suitable steps. For instance, the silicon mixture can be used to form a battery anode in a manner as disclosed in U.S. patent application Ser. No. 18/143,230 titled 'SILICON BATTERY AND METHOD FOR ASSEMBLY' filed 4 May 2023 which is incorporated in its entirety by this reference. However, a film can be cast in any manner.

In an illustrative example of silicon mixture formation, the silicon material (e.g., coated or uncoated) can be wet with alcohol (e.g., isopropyl alcohol (IPA), ethanol, etc.). After wetting the silicon material, the slurry solvent (e.g., ethanol, water, etc.) can be added to the wetted silicon material. Graphite (and/or other conductive materials such as conductive carbon materials) can optionally be added with the slurry solvent. The mixture of the silicon material, the slurry solvent, and the optional graphite can be sonicated (e.g., with a horn sonicator at 10-500 Watts) for a predetermined amount of time (e.g., 10 s, 30 s, 1 min, 3 min, 5 min, 10 min, etc.) then milled at a predetermined speed (e.g., 100 rpm, 300 rpm, 500 rpm, 1000 rpm, etc.) for a predetermined amount of time (e.g., 10 s, 30 s, 1 min, 3 min, 5 min, 10 min, 60 min, etc.). During the sonication and/or milling steps, the mixture can optionally be maintained in a vacuum environment (e.g., pressure less than about 760 torr). After milling, conductive additive and/or binder can be added (e.g., concurrently, simultaneously, sequentially, etc.) to the mixture. Each time another component is added, the mixture is preferably sonicated and/or milled (e.g., with the same or different sonication and/or milling conditions; before another component is added, after predetermined components have been added, etc.).

Figure 5:
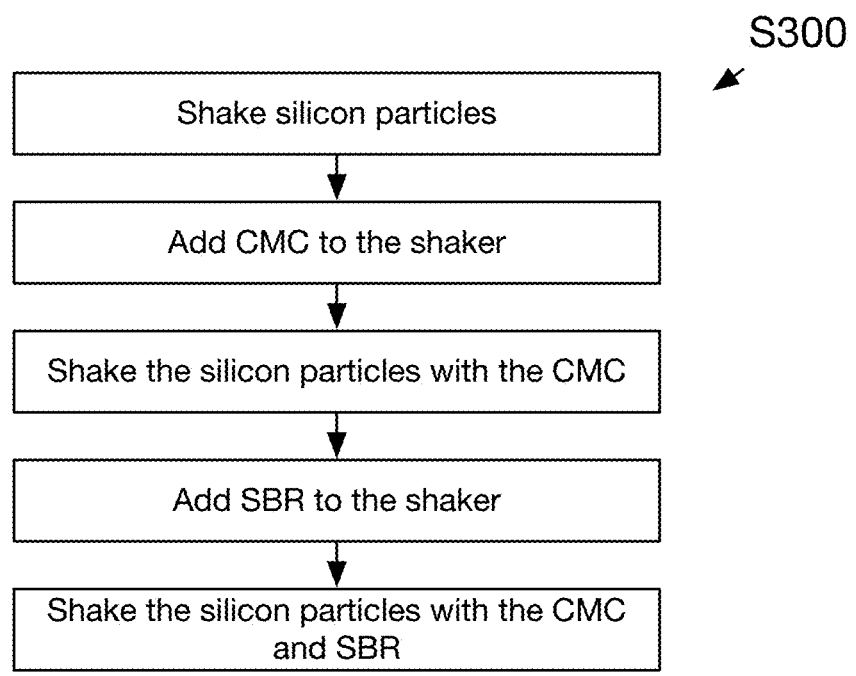
FIG. 5 is a flow chart representation of an example of making a silicon mixture.

In a second illustrative example, as shown for instance in FIG. 5, a method for manufacturing a silicon mixture can include: ball milling silicon materials (e.g., silicon particles) using a 50:50 weight ratio of balls (e.g., with a ball size of about 3 mm) to silicon material at between about 50-350 rpm for about 1-10 minutes (e.g., 3-5 min, 2-6 min, 1-5 min, 2-10 min, etc.). In variants of the second illustrative example, milling the silicon materials can function to break up agglomerates and/or large particles (e.g., decrease a particle size from micron scale to nanometer scale such as from 1-50 μm to 100-500 nm), decrease a silicon particle size, improve a uniformity of the size distribution of the silicon particles, increase or decrease a silicon material surface area, and/or can otherwise function, During ball milling of the silicon material, conductive material (e.g., graphite) can optionally be added (e.g., at an amount to achieve between about 1-15% by weight conductive material in the final silicon mixture). CMC can be added to the milling container (e.g., to achieve a target CMC to silicon material weight ratio such as between 1-10% by weight CMC in the final silicon mixture) and the combination of CMC, silicon material, and optional conductive material can be milled at between about 50-350 rpm for about 1-10 minutes. Subsequently, SBR can be added to the milling container (e.g., to achieve a target SBR to silicon material weight ratio such as between 1-10% by weight SBR in the final silicon mixture) and the combination of SBR, CMC, silicon material, and optional conductive material can be milled at between about 50-350 rpm for about 1-10 minutes. In variants of the second illustrative example, one or more of the silicon material, SBR, CMC, and/or conductive material can be dissolved or suspended in a solvent and/or solvent mixture (e.g., during and/or prior to addition in the milling container). In other variants of the second illustrative example, one or more of the silicon material, SBR, CMC, and/or conductive material can be melted (e.g., during and/or prior to addition in the milling container). In other variants of the second illustrative example, the silicon material, SBR, CMC, and conductive material can be milled as solids. The resulting silicon mixture from these processes is preferably a homogeneous mixture (e.g., nanoscopically homogeneous, mesoscopically homogeneous, macroscopically homogeneous, etc.).

In a third illustrative example, a method for making an anode slurry can include: in a mill shaker, mixing an active material, a conductive additive, and a binder in a solvent, where a ratio of the active material to the conductive additive to the binder is between 70:15:15 and 95:0:5 by mass, where an environment of the mill shaker is maintained under vacuum relative to atmospheric pressure while mixing the active material, the conductive additive, and the binder. In variations of the third illustrative example, the active material can include silicon particles and graphite. In variations of the third illustrative example, a mass ratio of the silicon particles to the graphite is between about 20:80 and 100:0. In variations of the third illustrative example, the method can include sonicating the silicon particles and the graphite before mixing the active material, the conductive additive, and the binder. In variations of the third illustrative example, the silicon particles and the graphite can be sonicated in alcohol (e.g., methanol, ethanol, isopropyl alcohol, etc.) where the alcohol can be removed before mixing the active material the conductive additive and the binder. In variations of the third illustrative example the silicon particles comprise aggregates of silicon nanoparticles, wherein a characteristic size of the aggregates is between about 1 μm and 5 μm. In variations of the third illustrative example the aggregates comprise silicon nanoparticles that are fused together, wherein an external specific surface area of the aggregates is less than about 20 $m^2/g$ and wherein an internal specific surface area of the aggregates is greater than about 50 $m^2/g$. In variations of the third illustrative example, wherein the conductive additive comprises at least one of: carbon nanotubes, graphene, C45 carbon black, or C65 carbon black. In variations of the third illustrative example the binder comprises carboxymethyl cellulose and styrene-butadiene rubber with a mass ratio between about 2:1 and 1:2. In variations of the third illustrative example a pressure of the environment is at most 250 mBar. In variations of the third illustrative example a shaking frequency of the mill shaker is between about 10 and 30 Hz. In variations of the third illustrative example the active material, the conductive additive, and the binder remain suspended in the solvent for at least 5 days. Each of the above variations can be combined in any suitable manner.

In a fourth illustrative example, a method can include mixing silicon particles and a conductive additive with a solvent for a threshold time (e.g., between about 1-10 minutes) in a first mixing step; adding carboxymethyl cellulose (CMC) to the silicon particles and the solvent; mixing the CMC, the silicon particles, and the solvent for a threshold time (e.g., between about 1-10 minutes) in a second mixing step; adding styrene-butyl rubber (SBR) to the CMC, the silicon particles, and the solvent; and mixing the SBR, the CMC, the silicon particles, and the solvent for a threshold time (e.g., between about 1-5 minutes) in a third mixing step; wherein a total time elapsed in the method is less than about 15 minutes. In variations of the fourth illustrative example, the method can include sonicating the silicon particles, the graphite particles, and/or the conductive additive (e.g., before the first mixing step) for a threshold time (e.g., about 1 minute), where the silicon particles and the graphite particles can be sonicated as a powder and or in the presence of a sonication solvent (e.g., water; alcohol such as ethanol, isopropyl alcohol, methanol, etc.; etc.), where the sonication solvent can be removed (e.g., evaporated using heat, changes in vapor pressure, etc.; filtered; etc.) before subsequent mixing steps. In variations of the fourth illustrative example mixing the silicon particles and the conductive additive can include mixing the silicon particles and the conductive additive with graphite particles. In variations of the fourth illustrative example a mass ratio of the silicon particles to the graphite particles is between about 20:80 and 100:0. In variations of the fourth illustrative example, a ratio of the active material comprising the silicon particles and the graphite particles to the conductive additive to the binder is between 70:15:15 and 95:0:5 by mass. In variations of the fourth illustrative example, the method can include cold welding silicon nanoparticles together to form the silicon particles, wherein the silicon nanoparticles are fused using ball milling. In variations of the fourth illustrative example, the method can include reducing silica particles to the silicon nanoparticles, wherein the silica particles are reduced using a magnesiothermic or aluminothermic reduction. In variations of the fourth illustrative example, the method can be performed in a mill shaker (e.g., shaking mill) and/or a planetary mill. In variations of the fourth illustrative example, a milling frequency of the mill shaker is between 10-30 Hz during the first mixing step, between 20-30 Hz during the second mixing step, and between 15 and 20 Hz during the third mixing step. In variations of the fourth illustrative example, an environmental pressure within the mill shaker is less than 500 mBar. In variations of the fourth illustrative example greater than about 80% of the active material (e.g., silicon particles, graphite, etc.), the CMC, the SBR, and the conductive additive remain suspended in the solvent for at least 5 days. Each of the above variations can be combined in any suitable manner.

Each of the above illustrative examples can be combined in any suitable manner.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, or values or ranges contained therebetween of a reference value), or be otherwise interpreted.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for making a silicon-containing anode slurry comprising:
   a) mixing silicon particles, graphite particles, and a conductive additive with a solvent for between about 1-10 minutes, wherein the conductive additive comprises at least one of carbon super P, acetylene black, carbon black, mesocarbon microbead, carbon nanotube, or fullerene;
   b) adding carboxymethyl cellulose (CMC) to the silicon particles, the graphite particles, the conductive additive, and the solvent;
   c) mixing the CMC, the silicon particles, the graphite particles, the conductive additive, and the solvent for between about 1-10 minutes;
   d) adding styrene-butyl rubber (SBR) to the CMC, the silicon particles, the graphite particles, the conductive additive, and the solvent; and
   e) mixing the SBR, the CMC, the silicon particles, the graphite particles, the conductive additive, and the solvent for between about 1-5 minutes;
   wherein a total time elapsed between steps a) and e) is less than about 15 minutes.

2. The method of claim 1, further comprising, before step a) sonicating the silicon particles and the graphite particles for about 1 minute, wherein the silicon particles and the graphite particles are sonicated as a powder.

3. The method of claim 1, wherein a mass ratio of the silicon particles to the graphite particles is between about 20:80 and 100:0.

4. The method of claim 3, where a ratio of the active material comprising the silicon particles and the graphite particles to the conductive additive to the binder is between 70:15:15 and 95:0:5 by mass.

5. The method of claim 1, further comprising cold welding silicon nanoparticles together to form the silicon particles, wherein the silicon nanoparticles are fused using ball milling.

6. The method of claim 5, further comprising reducing silica particles to the silicon nanoparticles, wherein the silica particles are reduced using a magnesiothermic or aluminothermic reduction.

7. The method of claim 1, wherein any of steps a), c), or e) are performed in a mill shaker.

8. The method of claim 7, wherein a frequency of the mill shaker is between 10-30 Hz during step a), between 20-30 Hz during step c), and between 15 and 20 Hz during step e).

9. The method of claim 7, wherein an environmental pressure within the mill shaker is less than 500 mBar.

10. The method of claim 1, wherein greater than about 80% of the silicon particles, the CMC, the SBR, and the conductive additive remain suspended in the solvent for at least 5 days.

* * * * *

UNITED STATES PATENT AND TRADEMARK OFFICE
CERTIFICATE OF CORRECTION

PATENT NO. : 12,057,568 B2
APPLICATION NO. : 18/219295
DATED : August 6, 2024
INVENTOR(S) : Robert Ionescu and Chueh Liu It is certified that error appears in the above-identified patent and that said Letters Patent is hereby corrected as shown below:

On the Title Page

Page 3, Column 2, item [56] Other Publications, Line 25, Delete "ofhollow" and insert --of hollow-- therefor In the Claims Column 23, Line 3, In Claim 8, delete "claim 7," and insert --claim 6,-- therefor Column 23, Line 6, In Claim 9, delete "claim 7," and insert --claim 6,-- therefor Signed and Sealed this
Seventeenth Day of September, 2024

Katherine Kelly Vidal
*Director of the United States Patent and Trademark Office*